(12) United States Patent
Zhou et al.

(10) Patent No.: US 11,653,181 B2
(45) Date of Patent: May 16, 2023

(54) NETWORK CODING SIDELINK DATA TRANSMISSION

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 17/316,473

(22) Filed: May 10, 2021

(65) Prior Publication Data

US 2021/0392472 A1 Dec. 16, 2021

Related U.S. Application Data

(60) Provisional application No. 63/039,752, filed on Jun. 16, 2020.

(51) Int. Cl.
*H04W 4/12* (2009.01)
*H04L 1/1867* (2023.01)
*H04W 72/04* (2023.01)
*H04W 80/02* (2009.01)
*H04W 72/044* (2023.01)
*H04W 92/18* (2009.01)

(52) U.S. Cl.
CPC ............ *H04W 4/12* (2013.01); *H04L 1/1896* (2013.01); *H04W 72/042* (2013.01); *H04W 72/0466* (2013.01); *H04W 80/02* (2013.01); *H04W 92/18* (2013.01)

(58) Field of Classification Search
CPC ... H04L 1/1896; H04L 1/0075; H04L 1/0009; H04L 1/0076; H04W 4/12; H04W 72/042; H04W 72/0466; H04W 80/02; H04W 92/18
USPC ......................................................... 370/329
See application file for complete search history.

(56) References Cited

U.S. PATENT DOCUMENTS

2020/0337096 A1* 10/2020 Zhang ................... H04L 1/0061
2021/0058989 A1* 2/2021 Simsek ................. H04L 47/283
2021/0168648 A1* 6/2021 Lee ......................... H04W 4/40

* cited by examiner

Primary Examiner — Rownak Islam
(74) Attorney, Agent, or Firm — Holland & Hart LLP

(57) ABSTRACT

Methods, systems, and devices for wireless communications are described. A base station and user equipment (UE) may support network coded communications on a sidelink connection. The base station may configure UEs with network coding configurations. The network coding configuration may include one or more sets of network coding parameters. The base station may configure a first UE to send network coded information on the sidelink to a second UE. The network coded information may be generated based on data packets which were unsuccessfully decoded by the second UE. By transmitting network coded information on a sidelink, the second UE may efficiently obtain data packets which were unsuccessfully decoded from the base station.

30 Claims, 20 Drawing Sheets

NETWORK CODING SIDELINK DATA TRANSMISSION

CROSS REFERENCE

The present Application for Patent claims the benefit of U.S. Provisional Patent Application No. 63/039,752 by Zhou et al., entitled "NETWORK CODING SIDELINK DATA TRANSMISSION," filed Jun. 16, 2020, assigned to the assignee hereof, and expressly incorporated by reference herein.

FIELD OF TECHNOLOGY

The following relates generally to wireless communications and more specifically to network coding sidelink data transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support network coding sidelink data transmissions. Generally, the described techniques provide for sending network coded information to a user equipment (UE) that previously unsuccessfully decoded the information. A base station may configure one or more UEs to communicate with one or more other UEs via sidelink connections. The base station may transmit a set of data packets to one or more of a first UE and a second UE via a direct link connection. The UEs may provide feedback related to the set of data packets, and the base station may determine that the first UE did successfully decode the data packets and that the second UE did not successfully decode all of the data packets. The base station may configure the first UE to send network coded information for the unsuccessfully decoded data packets to the second UE. The base station may configure one or more of the first UE and the second UE with network coding parameters, which may be used to generate and decode the network coded information. For example, the base station may configure the first UE to perform network coding on data packets which were successfully decoded by the first UE, but not successfully decoded by the second UE. The first UE may transmit the network coded packets to the second UE on the sidelink connection, which may enable the second UE to receive and decode all of the data packets, including the network coded packets transmitted from the first UE.

A method of wireless communication at a first device is described. The method may include transmitting a first message including a set of network coded packets to a second device and a third device, receiving, based on the first message, feedback indicating that that the second device successfully decoded a first set of the set of network coded packets and that the third device unsuccessfully decoded a second set the set of network coded packets, transmitting, to the second device based on receiving the feedback, a second message including a network coding configuration and configuring the second device to transmit a third message including information in the second set of the set of network coded packets of the first message to the third device on a sidelink connection, and receiving, based on the second message, feedback indicating that the third device successfully decoded the information in the second set of the set of network coded packets.

An apparatus for wireless communication at a first device is described. The apparatus may include a processor, memory coupled with the processor, and instructions stored in the memory. The instructions may be executable by the processor to cause the apparatus to transmit a first message including a set of network coded packets to a second device and a third device, receive, based on the first message, feedback indicating that that the second device successfully decoded a first set of the set of network coded packets and that the third device unsuccessfully decoded a second set the set of network coded packets, transmit, to the second device based on receiving the feedback, a second message including a network coding configuration and configuring the second device to transmit a third message including information in the second set of the set of network coded packets of the first message to the third device on a sidelink connection, and receive, based on the second message, feedback indicating that the third device successfully decoded the information in the second set of the set of network coded packets.

Another apparatus for wireless communication at a first device is described. The apparatus may include means for transmitting a first message including a set of network coded packets to a second device and a third device, receiving, based on the first message, feedback indicating that that the second device successfully decoded a first set of the set of network coded packets and that the third device unsuccessfully decoded a second set the set of network coded packets, transmitting, to the second device based on receiving the feedback, a second message including a network coding configuration and configuring the second device to transmit a third message including information in the second set of the set of network coded packets of the first message to the third device on a sidelink connection, and receiving, based on the second message, feedback indicating that the third device successfully decoded the information in the second set of the set of network coded packets.

A non-transitory computer-readable medium storing code for wireless communication at a first device is described. The code may include instructions executable by a processor to transmit a first message including a set of network coded packets to a second device and a third device, receive, based on the first message, feedback indicating that that the second device successfully decoded a first set of the set of network coded packets and that the third device unsuccessfully decoded a second set the set of network coded packets, transmit, to the second device based on receiving the feedback, a second message including a network coding configuration and configuring the second device to transmit a third message including information in the second set of the set of network coded packets of the first message to the third device on a sidelink connection, and receive, based on the second message, feedback indicating that the third device successfully decoded the information in the second set of the set of network coded packets.

Some examples of the method, apparatuses, and non-transitory computer-readable medium described herein may further include operations, features, means, or instructions for applying a set of network coding parameters to generate the first message, and configuring the second device to use the set of network coding parameters to generate the third message, where the network coding configuration indicates the set of network coding parameters.

Some examples of the method, apparatuses, and non-transitory computer-readable medium described herein may further include operations, features, means, or instructions for configuring the set of network coding parameters via radio resource control (RRC) signaling, where the network coding configuration in the second message indicates to the second device to use the set of network coding parameters.

Some examples of the method, apparatuses, and non-transitory computer-readable medium described herein may further include operations, features, means, or instructions for configuring the second device and the third device with a set of sets of network coding parameters, selecting a set of network coding parameters from the set of sets of network coding parameters, and transmitting an indication the set of network coding parameters to the second device, where the network coding configuration indicates the set of network coding parameters.

In some examples of the method, apparatuses, and non-transitory computer-readable medium described herein, the set of network coding parameters transmitted to the second device may be different than another set of network coding parameters used to generate the first message.

In some examples of the method, apparatuses, and non-transitory computer-readable medium described herein, the network coding configuration includes an indication to generate a set of network coding parameters to apply for the third message.

Some examples of the method, apparatuses, and non-transitory computer-readable medium described herein may further include operations, features, means, or instructions for transmitting, to the second device and the third device, an indication of one or more sets of network coding parameters associated with the set of network coded packets, where the one or more sets of network coding parameters include a network coding algorithm, an encoding function, an encoding matrix, a number of decoding iterations, or any combination thereof.

In some examples of the method, apparatuses, and non-transitory computer-readable medium described herein, the one or more sets of network coding parameters may be indicated via a medium access control (MAC) control element (MAC-CE), downlink control information (DCI), RRC signaling, or any combination thereof.

Some examples of the method, apparatuses, and non-transitory computer-readable medium described herein may further include operations, features, means, or instructions for configuring the sidelink connection between the second device and the third device, the second message may be transmitted to the second device based on configuring the sidelink connection.

In some examples of the method, apparatuses, and non-transitory computer-readable medium described herein, configuring the sidelink connection further may include operations, features, means, or instructions for configuring the second device and the third device to report connected one or more neighboring devices, changes to the one or more connected neighboring devices, lost connections to the one or more neighboring devices, one or more channel condition changes, one or more connection requests, or any combination thereof.

Some examples of the method, apparatuses, and non-transitory computer-readable medium described herein may further include operations, features, means, or instructions for determining a sidelink channel quality based on feedback from the second device, the third device, or both, and enabling or disabling a network coding scheme for the sidelink connection based on the sidelink channel quality satisfying a sidelink channel quality threshold.

Some examples of the method, apparatuses, and non-transitory computer-readable medium described herein may further include operations, features, means, or instructions for determining an overhead budget satisfies an overhead budget threshold, where the network coding scheme may be enabled or disabled based on the overhead budget satisfying the overhead budget threshold.

In some examples of the method, apparatuses, and non-transitory computer-readable medium described herein, enabling or disabling the network coding scheme may include operations, features, means, or instructions for transmitting, to the second device, the third device, or both, an indication that the network coding scheme may be enabled or disabled via a MAC-CE, DCI, or both.

Some examples of the method, apparatuses, and non-transitory computer-readable medium described herein may further include operations, features, means, or instructions for receiving, from the second device or the third device, a request to enable or disable a network coding scheme for the sidelink connection based on a sidelink channel quality satisfying a channel quality threshold, where the second message includes the network coding configuration based on enabling the network coding scheme.

Some examples of the method, apparatuses, and non-transitory computer-readable medium described herein may further include operations, features, means, or instructions for transmitting, to the second device, the third device, or both, an indication to enable or disable the network coding scheme via a MAC-CE, DCI, or both based on the request.

In some examples of the method, apparatuses, and non-transitory computer-readable medium described herein, the request to enable or disable the network coding scheme may be received via a MAC-CE, uplink control information (UCI), or both.

A method of wireless communication at a second device is described. The method may include receiving, from a first device, a first message including a set of network coded packets, transmitting feedback, based on the first message, indicating that the second device successfully decoded the set of network coded packets of the first message, receiving, from the first device based on the feedback, a second message including a network coding configuration and configuring the second device to transmit a third message including information in the set of network coded packets of the first message to a third device on a sidelink connection, generating the third message including the information in the set of network coded packets based on the network coding configuration in the second message, and transmitting, to the third device on the sidelink connection, the third message including the information in the set of network coded packets of the first message.

An apparatus for wireless communication at a second device is described. The apparatus may include a processor, memory coupled with the processor, and instructions stored in the memory. The instructions may be executable by the processor to cause the apparatus to receive, from a first device, a first message including a set of network coded packets, transmit feedback, based on the first message, indicating that the second device successfully decoded the set of network coded packets of the first message, receive, from the first device based on the feedback, a second message including a network coding configuration and configuring the second device to transmit a third message including information in the set of network coded packets of the first message to a third device on a sidelink connection, generate the third message including the information in the set of network coded packets based on the network coding configuration in the second message, and transmit, to the third device on the sidelink connection, the third message including the information in the set of network coded packets of the first message.

Another apparatus for wireless communication at a second device is described. The apparatus may include means for receiving, from a first device, a first message including a set of network coded packets, transmitting feedback, based on the first message, indicating that the second device successfully decoded the set of network coded packets of the first message, receiving, from the first device based on the feedback, a second message including a network coding configuration and configuring the second device to transmit a third message including information in the set of network coded packets of the first message to a third device on a sidelink connection, generating the third message including the information in the set of network coded packets based on the network coding configuration in the second message, and transmitting, to the third device on the sidelink connection, the third message including the information in the set of network coded packets of the first message.

A non-transitory computer-readable medium storing code for wireless communication at a second device is described. The code may include instructions executable by a processor to receive, from a first device, a first message including a set of network coded packets, transmit feedback, based on the first message, indicating that the second device successfully decoded the set of network coded packets of the first message, receive, from the first device based on the feedback, a second message including a network coding configuration and configuring the second device to transmit a third message including information in the set of network coded packets of the first message to a third device on a sidelink connection, generate the third message including the information in the set of network coded packets based on the network coding configuration in the second message, and transmit, to the third device on the sidelink connection, the third message including the information in the set of network coded packets of the first message.

Some examples of the method, apparatuses, and non-transitory computer-readable medium described herein may further include operations, features, means, or instructions for identifying a set of network coding parameters applied to the first message based at last in part on the network coding configuration, where, and generating the third message may be based on the set of network coding parameters.

Some examples of the method, apparatuses, and non-transitory computer-readable medium described herein may further include operations, features, means, or instructions for receiving an indication of the set of network coding parameters via RRC signaling, DCI information, or a MAC-CE, where identifying the set of network coding parameters applied to the first message may be based on receiving the indication of the set of network coding parameters.

Some examples of the method, apparatuses, and non-transitory computer-readable medium described herein may further include operations, features, means, or instructions for receiving, from the first device, a configuration including a set of sets of network coding parameters, identifying a set of network coding parameters from the set of sets of network coding parameters based on the network coding configuration in the second message, where, and generating the third message may be based on the identified set of network coding parameters.

In some examples of the method, apparatuses, and non-transitory computer-readable medium described herein, the set of network coding parameters used to generate the third message may be different than another set of network coding parameters applied to the first message.

Some examples of the method, apparatuses, and non-transitory computer-readable medium described herein may further include operations, features, means, or instructions for generating a set of network coding parameters for the third message based on the network coding configuration, where generating the third message may be based on the generated set of network coding parameters.

Some examples of the method, apparatuses, and non-transitory computer-readable medium described herein may further include operations, features, means, or instructions for receiving, from the first device, an indication of one or more sets of network coding parameters associated with the set of network coded packets, where the one or more sets of network coding parameters include a network coding algorithm, an encoding function, an encoding matrix, a number of decoding iterations, or any combination thereof.

In some examples of the method, apparatuses, and non-transitory computer-readable medium described herein, the indication of the one or more sets of network coding parameters may be received via a MAC-CE, DCI, RRC signaling, or any combination thereof.

Some examples of the method, apparatuses, and non-transitory computer-readable medium described herein may further include operations, features, means, or instructions for receiving, from the first device, a configuration for the sidelink connection between the second device and the third device, where the second message may be received from the first device based on receiving the configuration for the sidelink connection.

Some examples of the method, apparatuses, and non-transitory computer-readable medium described herein may further include operations, features, means, or instructions for reporting one or more connected neighboring devices, changes to the one or more connected neighboring devices, lost connections to the one or more neighboring devices, one or more channel condition changes, one or more connection requests, or any combination thereof.

Some examples of the method, apparatuses, and non-transitory computer-readable medium described herein may further include operations, features, means, or instructions for reporting a sidelink channel quality to the first device, and receiving an indication to enable or disable a network coding scheme for the sidelink connection based on the sidelink channel quality satisfying a sidelink channel quality threshold, where the second message includes the network coding configuration based on the indication to enable the network coding scheme.

Some examples of the method, apparatuses, and non-transitory computer-readable medium described herein may further include operations, features, means, or instructions for determining an overhead budget satisfies an overhead budget threshold, where the network coding scheme may be enabled or disabled based on the overhead budget satisfying the overhead budget threshold.

In some examples of the method, apparatuses, and non-transitory computer-readable medium described herein, the indication to enable or disable the network coding scheme may be received via a MAC-CE, DCI, or both.

Some examples of the method, apparatuses, and non-transitory computer-readable medium described herein may further include operations, features, means, or instructions for determining a sidelink channel quality of the sidelink connection, and transmitting, to the first device, a request to enable or disable a network coding scheme for the sidelink connection based on the sidelink channel quality satisfying a channel quality threshold, where the second message includes the network coding configuration based on the request to enable the network coding scheme.

Some examples of the method, apparatuses, and non-transitory computer-readable medium described herein may further include operations, features, means, or instructions for receiving, from the first device, an indication to enable or disable the network coding scheme via a MAC-CE, DCI, or both based on the request.

In some examples of the method, apparatuses, and non-transitory computer-readable medium described herein, the request to enable or disable the network coding scheme may be transmitted via a MAC-CE, UCI, or both.

A method of wireless communication at a third device is described. The method may include receiving, from a first device, a first message including a set of network coded packets, transmitting, based on the first message, feedback indicating that the third device unsuccessfully decoded the set of network coded packets of the first message, receiving, from a second device on a sidelink connection, a second message including information in the set of network coded packets of the first message, decoding the second message based on a network coding configuration, and transmitting feedback for the second message indicating that the third device successfully decoded the information in the set of network coded packets of the first message.

An apparatus for wireless communication at a third device is described. The apparatus may include a processor, memory coupled with the processor, and instructions stored in the memory. The instructions may be executable by the processor to cause the apparatus to receive, from a first device, a first message including a set of network coded packets, transmit, based on the first message, feedback indicating that the third device unsuccessfully decoded the set of network coded packets of the first message, receive, from a second device on a sidelink connection, a second message including information in the set of network coded packets of the first message, decode the second message based on a network coding configuration, and transmit feedback for the second message indicating that the third device successfully decoded the information in the set of network coded packets of the first message.

Another apparatus for wireless communication at a third device is described. The apparatus may include means for receiving, from a first device, a first message including a set of network coded packets, transmitting, based on the first message, feedback indicating that the third device unsuccessfully decoded the set of network coded packets of the first message, receiving, from a second device on a sidelink connection, a second message including information in the set of network coded packets of the first message, decoding the second message based on a network coding configuration, and transmitting feedback for the second message indicating that the third device successfully decoded the information in the set of network coded packets of the first message.

A non-transitory computer-readable medium storing code for wireless communication at a third device is described. The code may include instructions executable by a processor to receive, from a first device, a first message including a set of network coded packets, transmit, based on the first message, feedback indicating that the third device unsuccessfully decoded the set of network coded packets of the first message, receive, from a second device on a sidelink connection, a second message including information in the set of network coded packets of the first message, decode the second message based on a network coding configuration, and transmit feedback for the second message indicating that the third device successfully decoded the information in the set of network coded packets of the first message.

Some examples of the method, apparatuses, and non-transitory computer-readable medium described herein may further include operations, features, means, or instructions for identifying a set of network coding parameters applied to the first message based on the network coding configuration, where decoding the second message may be based on the set of network coding parameters.

Some examples of the method, apparatuses, and non-transitory computer-readable medium described herein may further include operations, features, means, or instructions for receiving an indication of the set of network coding parameters via RRC signaling, the second message, DCI, or a MAC-CE, where identifying the set of network coding parameters applied to the first message may be based on receiving the indication of the set of network coding parameters.

Some examples of the method, apparatuses, and non-transitory computer-readable medium described herein may further include operations, features, means, or instructions for receiving, from the first device, a configuration including a set of sets of network coding parameters, and identifying a set of network coding parameters from the set of sets of network coding parameters based on the second message and the network coding configuration, where decoding the second message may be based on the identified set of network coding parameters.

In some examples of the method, apparatuses, and non-transitory computer-readable medium described herein, the set of network coding parameters used to generate the second message may be different than another set of network coding parameters applied to the first message.

Some examples of the method, apparatuses, and non-transitory computer-readable medium described herein may further include operations, features, means, or instructions for receiving an indication of a set of network coding parameters used to generate the second message, where decoding the second message may be based on the set of network coding parameters.

In some examples of the method, apparatuses, and non-transitory computer-readable medium described herein, the network coding configuration may be received from the second device as part of the second message.

Some examples of the method, apparatuses, and non-transitory computer-readable medium described herein may further include operations, features, means, or instructions for receiving, from the first device, an indication of one or more sets of network coding parameters associated with the set of network coded packets, where the one or more sets of network coding parameters include a network coding algorithm, an encoding function, an encoding matrix, a number of decoding iterations, or any combination thereof.

In some examples of the method, apparatuses, and non-transitory computer-readable medium described herein, the indication of the one or more sets of network coding parameters may be received via a MAC-CE, DCI, RRC signaling, or any combination thereof.

Some examples of the method, apparatuses, and non-transitory computer-readable medium described herein may further include operations, features, means, or instructions for receiving, from the first device, a configuration for the sidelink connection between the second device and the third device where the second message may be received from the second device based on receiving the configuration for the sidelink connection.

Some examples of the method, apparatuses, and non-transitory computer-readable medium described herein may further include operations, features, means, or instructions for reporting one or more connected neighboring devices, changes to the one or more connected neighboring devices, lost connections with the one or more neighboring devices, one or more channel condition changes, one or more connection requests, or any combination thereof.

Some examples of the method, apparatuses, and non-transitory computer-readable medium described herein may further include operations, features, means, or instructions for reporting a sidelink channel quality to the first device, and receiving an indication to enable or disable a network coding scheme for the sidelink connection based on the sidelink channel quality satisfying a sidelink channel quality threshold, where the second message includes the network coding configuration based on the indication to enable the network coding scheme.

Some examples of the method, apparatuses, and non-transitory computer-readable medium described herein may further include operations, features, means, or instructions for determining an overhead budget satisfies an overhead budget threshold, where the network coding scheme may be enabled or disabled based on the overhead budget satisfying the overhead budget threshold.

In some examples of the method, apparatuses, and non-transitory computer-readable medium described herein, the indication to enable or disable the network coding scheme may be received via a MAC-CE, DCI, or both.

Some examples of the method, apparatuses, and non-transitory computer-readable medium described herein may further include operations, features, means, or instructions for determining a sidelink channel quality of the sidelink connection, and transmitting, to the first device, a request to enable or disable a network coding scheme for the sidelink connection based on the sidelink channel quality satisfying a channel quality threshold, where the second message includes the network coding configuration based on the request to enable the network coding scheme.

Some examples of the method, apparatuses, and non-transitory computer-readable medium described herein may further include operations, features, means, or instructions for receiving, from the first device, an indication to enable or disable the network coding scheme via a MAC-CE, DCI, or both based on the request.

In some examples of the method, apparatuses, and non-transitory computer-readable medium described herein, the request to enable or disable the network coding scheme may be transmitted via a MAC-CE, UCI, or both.

DETAILED DESCRIPTION

Figure 1:
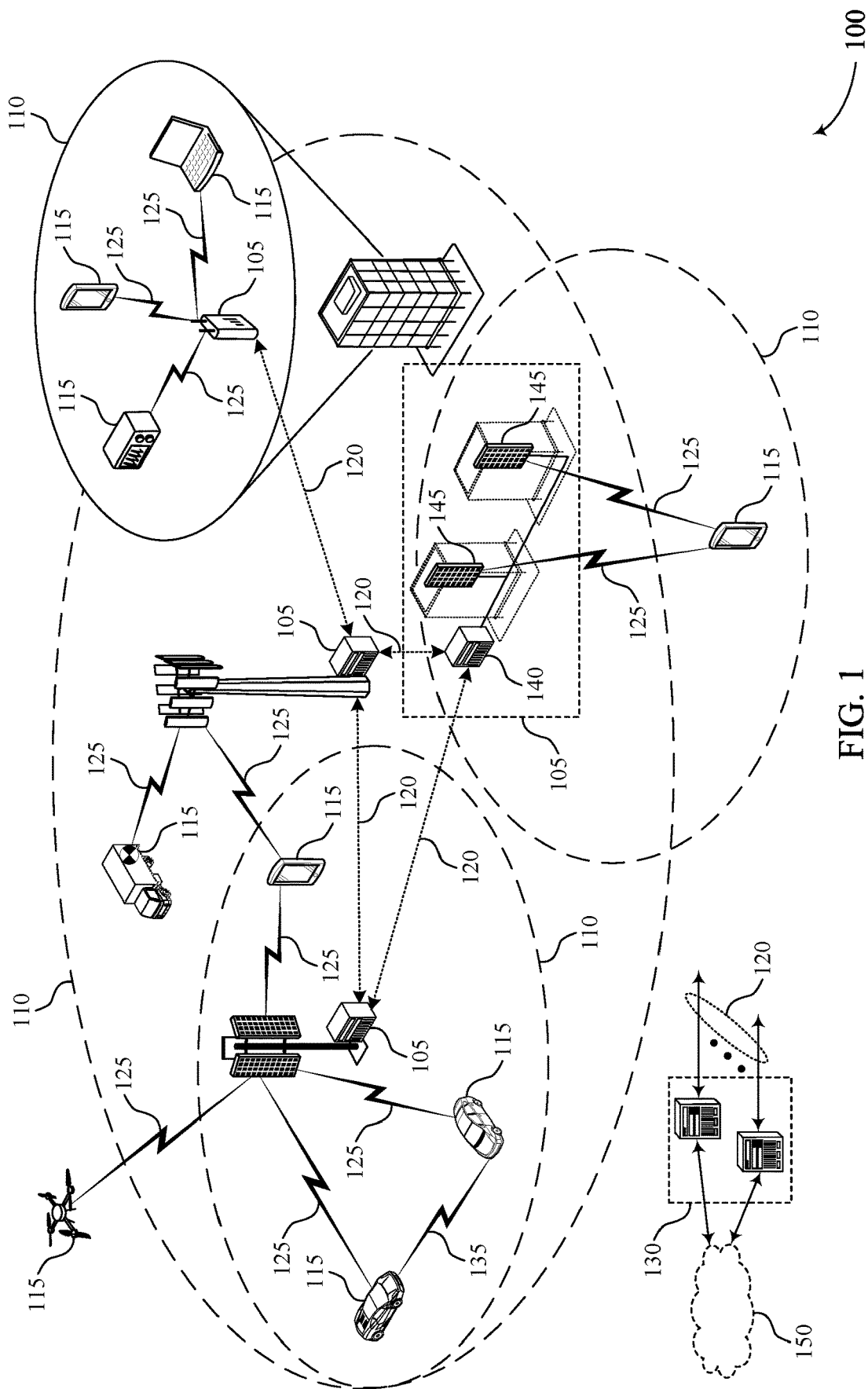
FIGS. 1 through 5 illustrate examples of a wireless communications system that supports network coding sidelink data transmission in accordance with aspects of the present disclosure.

In some wireless communications systems, a UE may communicate with one or more other UEs via sidelink connections. Some examples of sidelink communication may be device-to-device (D2D) communication, vehicle-to-vehicle (V2V) communication, vehicle-to-everything (V2X) communication, etc. In some examples, a UE may use a sidelink connection with a neighboring UE to obtain or relay missed information from a previous downlink transmission. For example, a base station may configure a first UE with a sidelink connection, for example, to a second neighboring UE and transmit a set of data packets to the first UE and the second neighboring UE via a direct link connection. In response, the second neighboring UE may attempt to decode the set of data packets and transmit feedback regarding the decoded data packets. In some examples, the second neighboring UE may only successfully decode a portion of the set of data packets and as such, the base station may receive feedback indicating only a portion of the set of data packets was successfully decoded at the second neighboring UE. Based on this feedback, the base station may configure the first UE to send, or relay, the missing data packets to the second neighboring UE on the sidelink connection. The first UE may individually transmit successfully decoded packets that were unsuccessfully decoded at the second neighboring UE, to the second neighboring UE, so that the second neighboring UE may receive the full set of data packets previously transmitted by the base station. However, individually transmitting decoded data packets from the first UE to the second neighboring UE may decrease system efficiency and throughput, among other disadvantages.

Some wireless communications systems may support network coding. Network coding may improve system efficiency. For example, instead of separately transmitting each data packet of a set of data packets, a base station may apply an algorithm or a function to the set of data packets to merge information from the set of data packet and transmit the result to a UE. That is, the base station (e.g., a network node) may indicate the set of data packets in a single transmission.

Some other different wireless communications systems provide techniques for network coding packets between a base station and a UE. However, these other different systems may not support utilizing network coded packets for sidelink communications. For example, in order to utilize network coding, network coding parameters (e.g., network coding algorithms, encoding function/matrix, number of coding iterations) may be synchronized at the transmitter and the receiver. Without synchronization, the UE may be unable to decode the network coded packets and thus, be unable to decode the missing data packets.

The techniques described herein provide for configuring a network coding scheme to communicate network coded packets between UEs, for example, on a sidelink connection. In some examples, a base station may configure a first UE with a set of network coding parameters to use for network coding sidelink communications. For example, a base station may configure a first UE with sidelink connections with one or more neighboring UEs. The base station may configure the first UE to perform network coding on data packets which were successfully decoded by the first UE but not successfully decoded by a second neighboring UE. The first UE may transmit the network coded packets to the second neighboring UE on a sidelink connection. In some examples, the base station may configure the first UE and the second neighboring UE with a set of network coding parameters. For example, the base station may indicate a set of network coding parameters which may be used for both direct link network coded communications with the base station and sidelink network coded communications between the first UE and the second UE.

Additionally, or alternatively, the base station may transmit multiple sets of network coding parameters, and the base station may indicate to use one of the sets of network coding parameters for the sidelink communication. For example, one set of network coding parameters may be used for direct link communications, and a different set of network coding parameters may be used for sidelink communications. In some examples, the UE may generate the network coding parameters to use for the network coding. The second neighboring UE may extract the network coding parameters from the network coded packets and decode the network coded packets transmitted by the first UE using the extracted parameters. The second neighboring UE may decode the missing data packets using the network coding parameters and transmit feedback for the decoded data packets to another device, such as the base station. By implementing these techniques, a first UE may signal two or more data packets in a single, network coded transmission to a second neighboring UE to increase system throughput and efficiency, among other advantages.

Aspects of the disclosure are initially described in the context of wireless communications systems. Aspects of the disclosure are further illustrated by and described with reference to apparatus diagrams, system diagrams, and flowcharts that relate to network coding sidelink data transmission.

FIG. 1 illustrates an example of a wireless communications system 100 that supports network coding sidelink data transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunications system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sending network coded packets on a sidelink connection between UEs 115. Sending network coded packets on the sidelink connection may assist a UE 115 in obtaining lost or unsuccessfully decoded data packets. To support network coding techniques on a sidelink connection, a base station 105 may configure UEs 115 with one or more sets of network coding parameters. In some examples, a UE 115 may generate network coded packets for the sidelink connection using the same network coding parameters as the direct link with the base station 105. In some cases, the base station 105 may configure the UEs 115 with multiple sets of network coding parameters. For example, the base station 105 may indicate a set of the network coding parameters a UE 115 is to use for a network coded transmission on a sidelink connection. In some cases, a UE 115 may generate network coding parameters for network coded communications on a sidelink connection.

Figure 2:
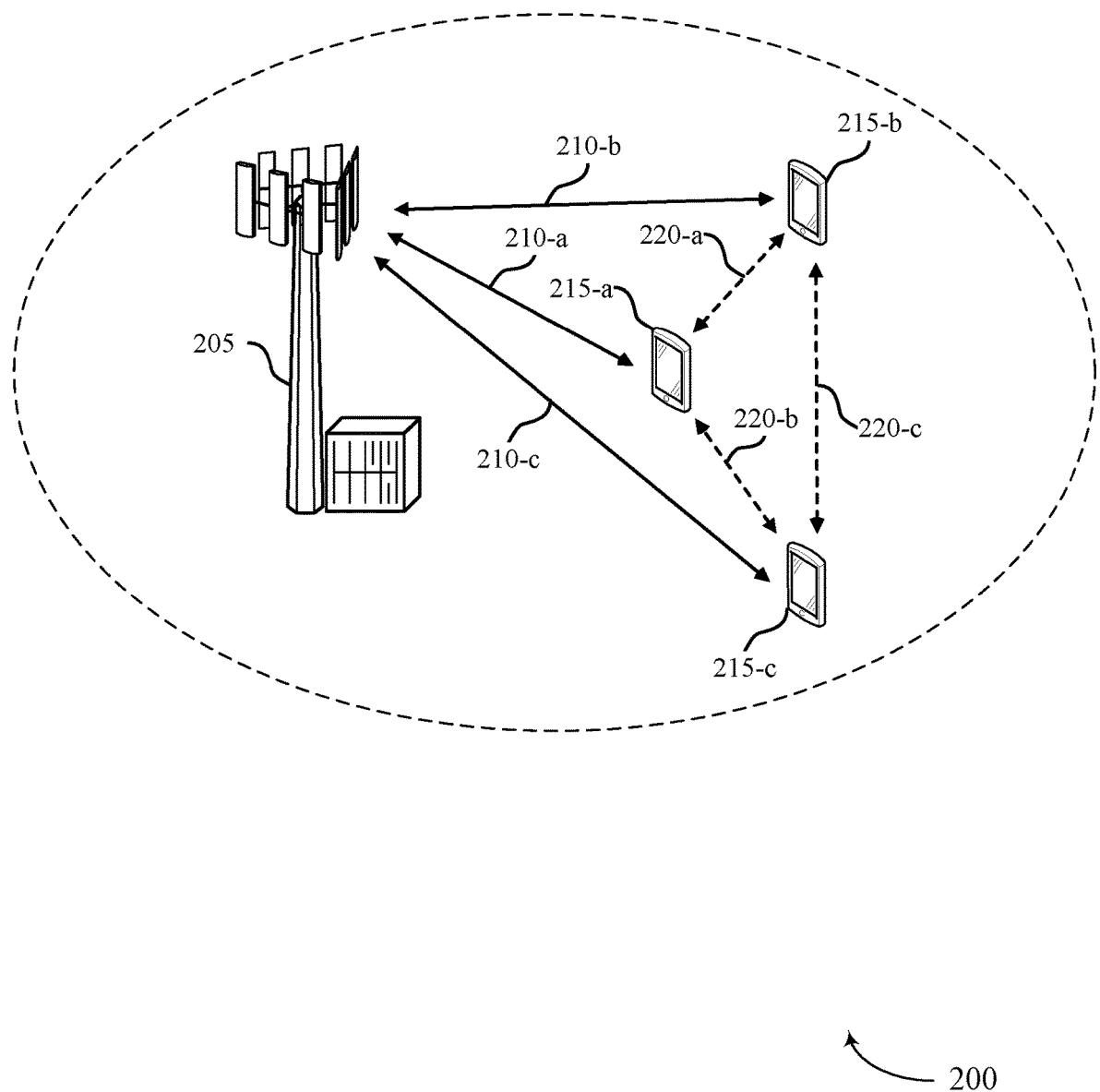

FIG. 2 illustrates an example of a wireless communications system 200 that supports network coding sidelink data transmission in accordance with aspects of the present disclosure. In some examples, the wireless communications system 200 may implement or may be implemented by aspects of a wireless communications system 100. For example, the wireless communications system 200 may include a base station 205, a UE 215-a, a UE 215-b, and a UE 215-c which may be examples of a base station 105 and UEs 115 as described with reference to FIG. 1.

The base station 205 may communicate with one or more UEs 215. For example, base station 205 may communicate with the UE 215-a via a direct link 210-a, the UE 215-b via a direct link 210-b, and the UE 215-c via a direct link 210-c. Additionally, at least some of the UEs 215 may communicate with each other via sidelink connections. For example, the UE 215-a may communicate with the UE 215-b using a sidelink connection 220-a, the UE 215-b may communicate with the UE 215-c using a sidelink connection 220-c and the UE 215-c may communicate with the UE 215-a using a sidelink connection 220-b. In some examples, the sidelink connections 220 may be configured by the base station 205.

The base station 205 may configure the sidelink connections 220. In some cases, the base station 205 may configure communications and reporting for the sidelink connections 220. For example, the base station 205 may configure a UE 215 to report about connected neighboring devices on a sidelink connection 220. The UE 215 may report to the base station 205 about any changes to a connected neighboring device, such as any lost connections or connection requests, or changes to channel conditions. In some cases, the base station 205 may configure a memory in the UE 215 to store decoded packet information, configurations or connection statuses for connected neighboring devices, channel conditions of neighboring devices, etc.

In some cases, communications on the sidelink connections 220 may be configured by the base station 205. For example, the base station 205 may transmit grants for sidelink communications to the UEs 215. The base station 205 may indicate allocated resources, carrier frequencies, modulation and coding scheme values, transmission start and end times, etc. for communications on a sidelink connection 220. In some cases, the UEs 215 may communicate on the sidelink connections 220 according to the configurations from the base station 205.

The wireless communications system 200 may support network coding procedures. Network coding may enable devices to create a function of information from a set of data packets and transmit the function of the data packets to the UE 215 (e.g., network coded packets). Network coding may improve system efficiency and reliability. A device may generate a set of network coded packets by merging some information from data packets together into network coded packets. For example, the network coded packets may include some information from each of the data packets. For example, metadata from two separate data packets may be merged into a network coded packet. A receiver may be able to retrieve the original data packet if the receiver obtains sufficient information for the data packet from the network coded packets. In some cases, the transmitter and the receiver may have the same set of network coding parameters to encode and decode the network coded packets, so that the receiver and decode the network coded packets and obtain the original data packets.

The base station 205 may utilize network coding to transmit a message to one or more UEs 215. For example, the base station 205 may transmit network coded packets to the one or more UEs 215 via a direct links 210 instead of transmitting each individual data packet. The base station 205 may indicate a set of network coding parameters to the one or more UEs 215. The network coding parameters may be synchronized between the base station 205 and the one or more UEs 215 to ensure that the one or more UEs 215 may decode the network coded packets and retrieve the original data packets. The set of network coding parameters may include, for example, an encoding matrix, an encoding function, a decoding function, a number of decoding iterations (e.g., a maximum number of decoding iterations) or any combination thereof. In some cases, the base station 205 may configure the one or more UEs 215 with one or more sets of network coding parameters via the direct links 210.

In some cases, the base station 205 may send a set of network coded packets to multiple UEs 215. For example, the base station 205 may send a set of network coded packets to the UE 215-a, the UE 215-b, and the UE 215-c. However, some of the UEs 215 may not successfully decode all of the data packets in the set. For example, the UE 215-a may successfully decode the full set of network coded packets, but the UE 215-*b* and the UE 215-*c* may only successfully decode a portion of the set of network coded packets. In some cases, the UE 215-*b* may successfully decode a different portion of the set of data packets than the UE 215-*c*.

The UEs 215 may provide feedback to the base station 205 for the network coded packets to indicate the successfully decoded data packets. For example, the UE 215-*a* may transmit feedback to the base station 205 indicating that the full set of data packets were successfully decoded (e.g., which data packets were successfully decoded or an indication that all data packets transmitted were successfully decoded). Additionally, the UE 215-*b* and the UE 215-*c* may transmit feedback indicating which portions of the set of data packets were successfully decoded. From this feedback, the base station 205 may determine which data packets the UE 215-*b* or the UE 215-*c* or both did not successfully decode (e.g., are missing). Additionally, base station 205 may determine that the UE 215-*a* successfully decoded the data packets unsuccessfully decoded by the UE 215-*b* and the UE 215-*c*. In some cases, the base station 205 may determine which portions of the data packets were unsuccessfully decoded at the UE 215.

In some wireless communications systems, a base station 105 may configure a UE 215 to send one or more decoded data packets on a sidelink connection to a neighboring device that did not successfully decode one or more data packets. For example, in response to the feedback, the base station 205 may instruct the UE 215-*a* to separately transmit the one or more missing data packets to the UE 215-*b* and the UE 215-*c* on respective sidelink connections 220. By configuring the UE 215-*a* to send the missing data packets, the UE 215-*b* and the UE 215-*c* may receive the full set of data packets. However, separately transmitting the missing data packets to the UE 215-*b* and the UE 215-*c* may be inefficient and unreliable. For example, transmitting decoded packets may take longer to individually send and may be more susceptible to lossy channel conditions, resulting in latency and, in some cases, missed packets, among other disadvantages.

Wireless communications systems described herein, such as the wireless communications system 200, may support sending network coded packets on the sidelink connections 220. For example, the UEs 215 may utilize network coding to generate network coded packets and transmit network coded information on sidelink connections 220. To support network coding techniques on a sidelink connection 220, the base station 205 may configure the UEs 215 with one or more sets of network coding parameters. Configuring the UEs 215 with the one or more sets of network coding parameters may support transmission and decoding of network coded packets on the sidelink connection 220.

In some examples, a UE 215 may generate network coded packets for the sidelink connection 220 using the same network coding parameters as the direct links 210. For example, the base station 205 may configure the UEs 215 with a set of network coding parameters. The set of network coding parameters may be used to generate network coded packets which are transmitted on the direct links 210. The UE 215 may use the set of network coded parameters to encode data packets and transmit the encoded packets to UEs 215 in need on a sidelink connection 220. For example, base station 205 may configure the UE 215-*a* to encode data packets missing at the UE 215-*b* using the set of network coding parameters. The base station 205 may configure the UE 215-*a* to transmit functions of the data packets to the UE 215-*b*. The UE 215-*b* may receive the encoded packets and use the set of network coding parameters to decode the packets. For example, the UE 215-*b* may decode the packets similar to decoding network coded packets transmitted on the direct links 210. The UE 215-*b* may then obtain the missing data packets and send feedback to the base station 205 to indicate the data packets were successfully decoded. The UE 215-*a* may similarly transmit network coded packets to the UE 215-*c* for any missing data packets at the UE 215-*c*.

In some cases, the base station 205 may configure the UEs 215 with multiple sets of network coding parameters. For example, the base station 205 may preconfigure the UEs 215 with a first set of network coding parameters and a second set of network coding parameters. In some examples, the UEs 215 may use the first set of coding parameters for direct link communications and use the second set of coding parameters for sidelink communications. Additionally, or alternatively, the UEs 215 may be configured with multiple sets of network coding parameters which may be used for the direct links 210, the sidelink connections 220, or both. For example, the base station 205 may configure the UE 215-*a* to encode data packets missing at the UE 215-*b* using the second set of network coding parameters. The UE 215-*a* may transmit the function of the data packets to the UE 215-*b* on sidelink connection 220-*a*. The UE 215-*b* may receive the encoded packets, extract the second set of network coding parameters and decode the data packets. In some cases, the UE 215-*a* may indicate that the second set of network coding parameters were used to generate the network coded packets sent on the sidelink connection 220-*a*. The UE 215-*a* may similarly transmit network coded packets to the UE 215-*c* for any missing data packets at the UE 215-*c*.

In some cases, a UE 215 may generate network coding parameters. For example, the base station 205 may preconfigure the UEs 215 with a set of network coding parameters for direct link communications, and the UEs 215 may use self-generated network coding parameters for network coded communications on the sidelink connections 220. For example, the base station 205 may configure the UE 215-*a* to transmit missing data packets to the UE 215-*b*. The UE 215-*a* may generate a set of coding parameters and operate on the data packets to generate encoded packets. The UE 215-*a* may transmit the encoded packets to the UE 215-*b* on the sidelink connection 220-*a*. In some cases, the UE 215-*a* may include an indication of the self-generated network coding parameters with the encoded packets. The UE 215-*b* may extract the self-generated coding parameters and decode the network coded packets according to the coding parameters stated in the indication message to obtain the original missing data packets. That is, a function of the missing portion of the data packets may be sent in a single transmission to the UE 215-*b*, effectively increasing system throughput and reliability. The UE 215-*a* may similarly transmit network coded packets to the UE 215-*c* for any missing data packets at the UE 215-*c*.

In some cases, the network coded information sent on a sidelink connection may be based on information in a missing data packet. For example, the base station 205 may determine what information is missing from data packets which were unsuccessfully received at the UE 215-*b*, and the base station 205 may configure the UE 215-*a* to generate a network coded packet based on the missing information. In some examples, the network coded packet generated at the UE 215-*a* may be based on the missing information or based on the full data packet. In some cases, a network coded packet sent on the sidelink connection 220 may be generated based on a data packet which was successfully decoded. For example, using a successfully decoded packet to generate a network coded packet may assist the receiver in obtaining the unsuccessfully decoded data packet from the network coded packet.

In some examples, network coding may be activated or deactivated for the sidelink connections 220. For example, the base station 205 and the UEs 215 may activate or deactivate network coding based on channel quality, an overhead budget, or both. For example, if the channel quality is above a threshold or the overhead budget is below a threshold, network coding may be deactivated. For example, if network coding is deactivated, the UE 215-a may send the original data packets to the UEs 215 missing data packets. Alternatively, if the channel quality value is below a threshold and the overhead budget is above a threshold, network coding may be activated. In some cases, the base station 205 activate or deactivate network coding on the sidelink connections. For example, the base station 205 may determine the channel quality based on feedback from the UEs 215. The base station 205 may indicate activation or deactivation via a MAC control element (MAC-CE) or downlink control information (DCI). In some cases, the UEs 215 may request to activate or deactivate network coding on the sidelink connections 220. For example, the UEs 215 may detect data transmission quality on the sidelink connections 220 and send a request to activate or deactivate network coding to the base station 205. The request to activate or deactivate may be sent via MAC-CE or uplink control information (UCI).

Figure 3:
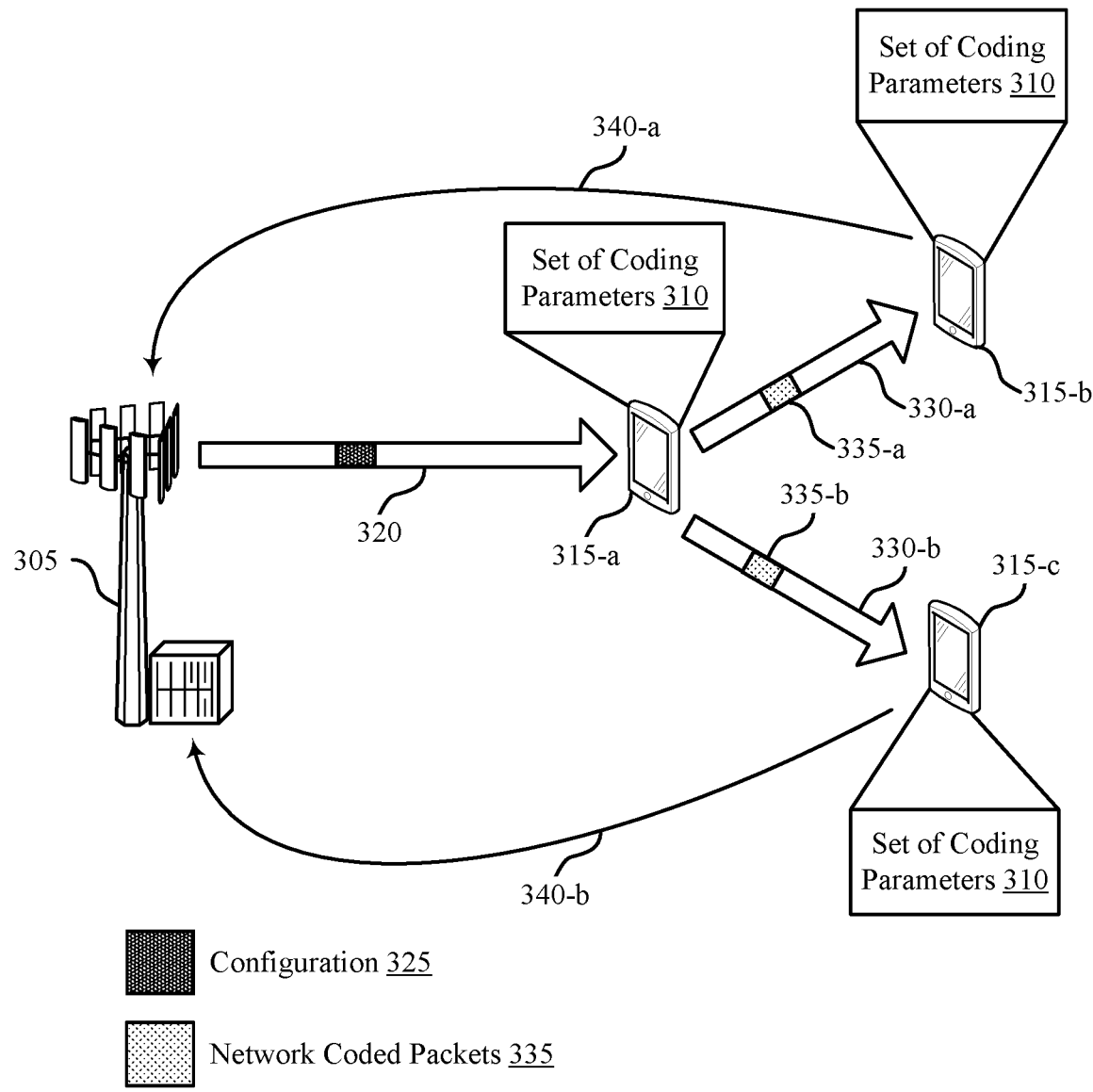

FIG. 3 illustrates an example of a wireless communications system 300 that supports network coding sidelink data transmission in accordance with aspects of the present disclosure. In some examples, the wireless communications system 300 may implement or may be implemented by aspects of a wireless communications system 100 and a wireless communications system 200. For example, the wireless communications system 300 may include a base station 305, which may be an example of a base station 105 or a base station 205 as described with reference to FIGS. 1 and 2. The wireless communications system 300 may also include a UE 315-a, a UE 315-b, and a UE 315-c, which may be examples of UEs 115 or UEs 215 as described with reference to FIGS. 1 and 2.

The UEs 315 may communicate with the base station 305 via direct links. For example, the UE 315-a may communicate with the base station 305 via a direct link 320. The UE 315-b and the UE 315-c may also have direct links established with the base station 305. The UEs 315 may communicate with each other over a sidelink connection 330. For example, the UE 315-a and the UE 315-b may communicate over a sidelink connection 330-a, and the UE 315-a and the UE 315-c may communicate over a sidelink connection 330-b. In some examples, the UE 315-b and the UE 315-c may also have a sidelink connection established.

In some cases, the base station 305 may configure the sidelink connections 330. In some cases, the base station 305 may configure the UEs 315 to report about connected neighboring devices on the sidelink connections 330, any changes to connected neighbors (e.g., lost or added connections), channel condition changes, or any combination thereof. In some cases, transmission on the sidelink connections 330 may be configured by the base station 305. For example, the base station 305 may transmit a grant for a UE 315 to communicate on a sidelink connection 330. The base station 305 may indicate a carrier frequency, a modulation and coding scheme value, a transmission start and end time, among other parameters, for communicating on the sidelink connection 330.

The wireless communications system 300 may support sending network coded packets on the sidelink connection 330. For example, the UE 315 may apply network coding to generate network coded packets for sidelink communications. In some cases, the UE 315 may use network coding to transmit information from multiple data packets in a single sidelink transmission. Network coding may be used to relay or retransmit data packets, or information from the data packets, unsuccessfully decoded by the UE 315.

For example, the base station 305 may transmit a message including a set of network coded data packets to the UEs 315 on direct links. The message may include a first data packet, a second data packet, and a third data packet which have been network coded together. The UEs 315 may attempt to decode the network coded packets and transmit feedback to the base station 305 indicating decoded packet information. For example, the UE 315-a may have successfully decoded all of the packets and indicate the successfully decoded packets to the base station 305. The UE 315-b may have successfully decoded the third data packet, but unsuccessfully decoded the first data packet and the second data packet. The feedback from the UE 315-b may indicate that the third data packet was successfully decoded. The UE 315-c may have successfully decoded just the second data packet, and the feedback from the UE 315-c may indicate that the second data packet was successfully decoded. Based on the feedback, the base station 305 may determine which UEs 315 are missing data packets and which UEs 315 can provide the missing data packets. For example, the base station 305 may determine that the UE 315-b is missing the first data packet and the second data packet and the UE 315-c is missing the first data packet and the third data packet. Additionally, the base station 305 may determine that the UE 315-a can provide the missing data packets to the UE 315-b and the UE 315-c.

In some cases, the base station 305 may configure the UEs 315 with a set of network coding parameters 310. The set of network coding parameters 310 may enable the UEs 315 to generate and decode network coded packets. For example, the set of network coding parameters 310 may include network coding algorithms, encoding function/matrix, number of decoding iterations (e.g., a maximum number of decoding iterations), etc. In some examples, the set of network coding parameters 310 may be signaled to the UEs 315 via RRC signaling and updated via a MAC-CE or DCI on a direct link.

The base station 305 may transmit a configuration 325 to the UE 315-a on the direct link 320. The configuration 325 may instruct the UE 315-a to perform network coding on the data packets missing at the UE 315-b and the UE 315-c and to transmit network coded packets 335 with the missing packets to the UE 315-b and the UE 315-c. In some cases, the set of network coding parameters used to send network coded packets 335 on a sidelink connection 330 may be the same as the set of network coding parameters used to send network coded packet on the direct links.

The UE 315-a may use the set of network coding parameters 310 to generate network coded packets 335 with information from the missing data packets for the UE 315-b and the UE 315-c. For example, the network coded packets 335-a to the UE 315-b may include a function of the first data packet and the second data packet. The network coded packets 335-b to the UE 315-c may include a function of the first data packet and the third data packet. The UE 315-b and the UE 315-c may decode the network coded packets 335 using the set of network coding parameters 310. For example, the network coded packets 335 sent on the sidelink connections 330 may use the same network coding parameters 310 as network coded packets sent on direct links, so the UE 315-b and the UE 315-c may decode the network coded packets 335 on the sidelink connection the same way as decoding network coded packets on direct links.

The UEs 315 may provide feedback 340 to the base station 305 for the network coded packets 335 received on the sidelink connections 330. For example, the UE 315-b may provide feedback 340-a indicating the first data packet and the second data packet were successfully decoded, and the UE 315-c may provide feedback 340-a indicating the first data packet and the third data packet were successfully decoded.

Figure 4:
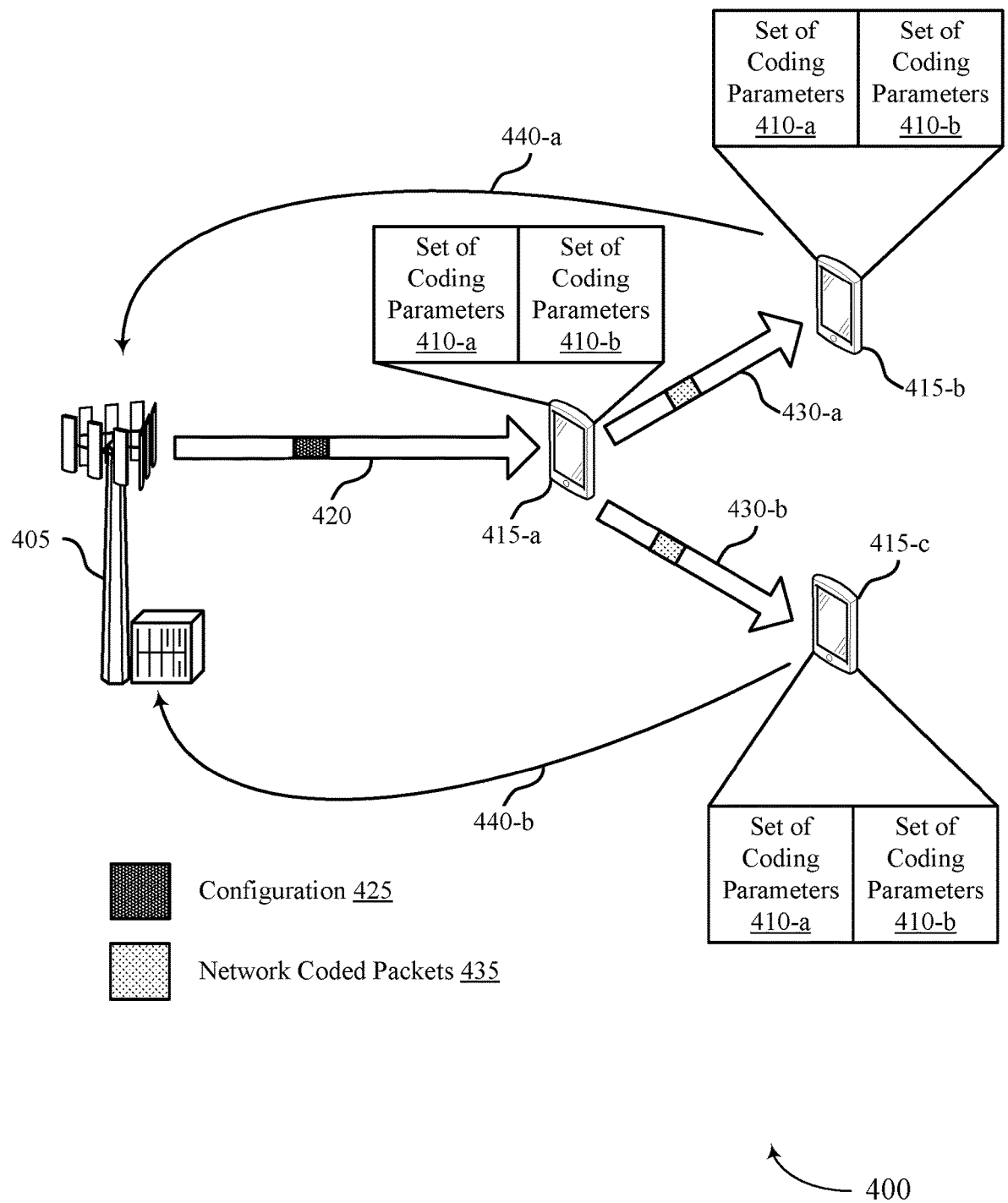

FIG. 4 illustrates an example of a wireless communications system 400 that supports network coding sidelink data transmission in accordance with aspects of the present disclosure. In some examples, the wireless communications system 400 may implement or may be implemented by aspects of a wireless communications system 100, a wireless communications system 200, and a wireless communications system 300. For example, the wireless communications system 400 may include a base station 405, which may be an example of a base station 105, a base station 205, or a base station 305 as described with reference to FIGS. 1 through 3. The wireless communications system 400 may also include a UE 415-a, a UE 415-b, and a UE 415-c, which may be examples of UEs 115, UEs 215, or UEs 315 as described with reference to FIGS. 1 through 3.

The UEs 415 may communicate with the base station 405 via direct links. For example, the UE 415-a may communicate with the base station 405 via a direct link 420. The UE 415-b and the UE 415-c may also have direct links established with the base station 405. The UEs 415 may communicate with each other over a sidelink connection 430. For example, the UE 415-a and the UE 415-b may communicate over a sidelink connection 430-a, and the UE 415-a and the UE 415-c may communicate over a sidelink connection 430-b. In some examples, the UE 415-b and the UE 415-c may also have a sidelink connection established. In some cases, the base station 405 may configure the sidelink connections 430.

The wireless communications system 400 may support sending network coded packets on a sidelink connection 430. For example, a UE 415 may apply network coding to generate network coded packets for sidelink communications. In some cases, a UE 415 may use network coding to transmit multiple data packets in a single sidelink transmission to relay data packets, or information from the data packets, which were unsuccessfully decoded by another UE 415.

For example, the base station 405 may transmit a message including a set of network coded data packets to the UEs 415 on direct links. The message may include a first data packet, a second data packet, and a third data packet which have been network coded together. The UEs 415 may attempt to decode the network coded packets and transmit feedback to the base station 405 indicating decoded packet information.

For example, the UE 415-a may have successfully decoded all of the packets and indicate the successfully decoded packets to the base station 405. The UE 415-b may have successfully decoded the third data packet but unsuccessfully decoded the first data packet and the second data packet. The feedback from the UE 415-b may indicate that the third data packet was successfully decoded. The UE 415-c may have successfully decoded just the second data packet, and the feedback from the UE 415-c may indicate that the second data packet was successfully decoded. Based on the feedback, the base station 405 may determine which UEs 415 are missing data packets and which UEs 415 can provide the missing data packets. For example, the base station 405 may determine that the UE 415-b is missing the first data packet and the second data packet and the UE 415-c is missing the first data packet and the third data packet. Additionally, the base station 405 may determine that the UE 415-a may provide the missing data packets to the UE 415-b and the UE 415-c.

In the example of the wireless communications system 400, the base station may configure the UEs 415 with multiple sets of network coding parameters 410. In some cases, different sets of network coding parameters 410 may be used for different communication links. For example, a first set of network coding parameters 410-a may be used for network coded packets on a direct link from the base station 405, and a second set of network coding parameters 410-b may be used for network coded packets send on sidelink connections 430. For example, the network coding parameters 410-a may be used for network coded communications on the direct link 420, and network coding parameters 410-b may be used for network coded communications on the sidelink connections 430. In some cases, there may be multiple different network coding parameters which may be used for the direct links, sidelink connections 430, or both. In some examples, the base station 405 may signal the set of network coding parameters 410-a and the set of network coding parameters 410-b the UEs 415 using RRC signaling and may, in some cases, update the sets by transmitting a MAC-CE or DCI to the UEs 415.

The base station 405 may transmit a configuration 425 to the UE 415-a via the direct link 420. The configuration 425 may instruct UE 415-a to perform network coding on the data packets missing at the UE 415-b and the UE 415-c. In some cases, the configuration 425 may indicate a set of network coding parameters 410 from the multiple set of network coding parameters 410 to use to generate the network coded packets. For example, the configuration 425 may indicate for the UE 415-a to use set of network coding parameters 410-b.

Using the set of network coding parameters 410-b, the UE 415-a may generate the network coded packets 435-a for transmission to the UE 415-b and the network coded packets 435-b for transmission to the UE 415-c. The UE 415-a may generate a function of the first data packet and the second data packet for the network coded packets 435-a and a function of the first data packet and the third data packets for the network coded packets 435-b. The UE 415-a may transmit the network coded packets 435-a to the UE 415-b on the sidelink connection 430-a and transmit the network coded packets 435-b to the UE 415-c on the sidelink connection 430-b. In some examples, the UE 415-a may send an indication to the UE 415-b and the UE 415-c to use the second set of network coding parameters 410-b to decode the network coded packets 435.

The UE 415-b and the UE 415-c may decode the network coded packets 435 using the second set of network coding parameters 410-b. The UE 415-b may provide feedback 440-a indicating the decoded first data packet and the decoded second data packet, and the UE 415-c may provide feedback 440-a indicating the decoded first data packet and the decoded third data packet to the base station 405.

In some examples, the UE 415-b and the UE 415-c may use multiple sets of network coding parameters 410 to attempt to decode the network coded packets 435 to determine which set of network coding parameters 410 were used. For example, the UE 415-*b* and the UE 415-*c* may attempt to decode the network coded packets 435 using the first set of network coding parameters 410-*b* and then attempt decoding using the second set of network coding parameters 410-*b*.

Figure 5:
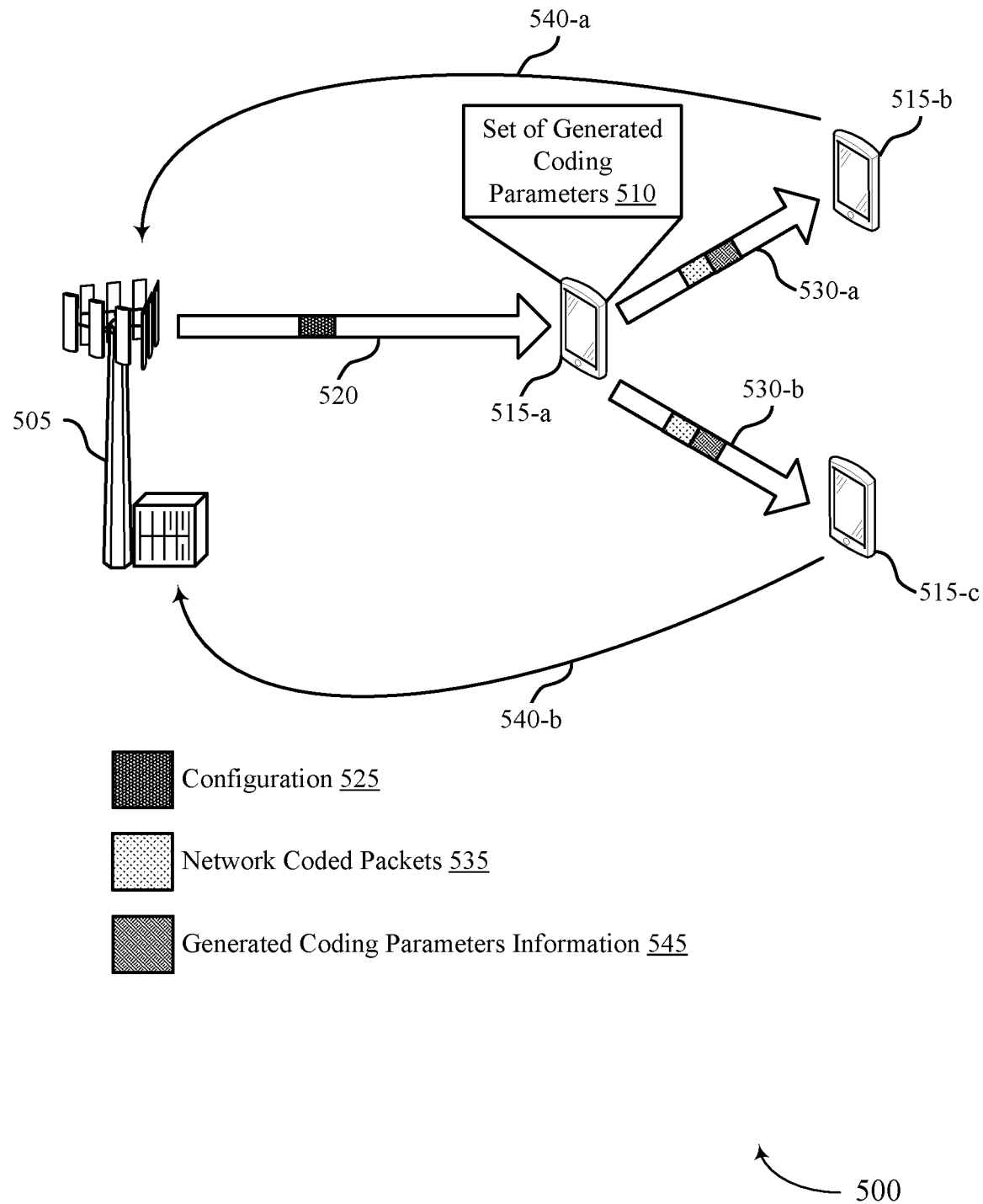

FIG. 5 illustrates an example of a wireless communications system 500 that supports network coding sidelink data transmission in accordance with aspects of the present disclosure. In some examples, the wireless communications system 500 may implement or may be implemented by aspects of a wireless communications system 100, a wireless communications system 200, a wireless communications system 300, and a wireless communications system 400. For example, the wireless communications system 500 may include a base station 505, which may be an example of a base station 105, a base station 205, a base station 305, or a base station 405 as described with reference to FIGS. 1 through 4. The wireless communications system 500 may include a UE 515-*a*, a UE 515-*b*, and a UE 515-*c*, which may be examples of UEs 115, UEs 215, UEs 315, and UEs 415 as described with reference to FIGS. 1 through 4.

The UEs 515 may communicate with the base station 505 via direct links. For example, the UE 515-*a* may communicate with the base station 505 via the direct link 520. the UE 515-*b* and the UE 515-*c* may also have direct links established with the base station 505. The UEs 515 may communicate with each other over a sidelink connection 530. For example, the UE 515-*a* and the UE 515-*b* may communicate over a sidelink connection 530-*a*, and the UE 515-*a* and the UE 515-*c* may communicate over a sidelink connection 530-*b*. In some examples, the UE 515-*b* and the UE 515-*c* may also have a sidelink connection 530 established. In some cases, the base station 505 may configure the sidelink connections 530 over the direct links.

The wireless communications system 500 may support sending network coded packets on a sidelink connection 530. For example, a UE 515 may apply network coding to generate network coded packets for sidelink communications. In some cases, a UE 515 may use network coding to transmit multiple data packets in a single sidelink transmission to relay data packets, or information from the data packets, which were unsuccessfully decoded by another UE 515.

The base station 505 may transmit a configuration 525 to the UE 515-*a* via the direct link 520. In some cases, the configuration 525 may instruct the UE 515-*a* to generate a set of network coding parameters 510 and transmit the network coded packets 535 to the UE 515-*b* and the UE 515-*c*. The UE 515-*a* may generate the set of network coding parameter 510 (e.g., generate an encoding matrix) and operate on the missing data packets using the set of generated network coding parameters 510. For example, the UE 515-*a* may transmit the network coded packets 535-*a* including a function of the first data packet and the second data packet to the UE 515-*b* via the sidelink connection 530-*a*. The UE 515-*a* may transmit the network coded packets 535-*b* including a function of the first data packet and the third data packets to the UE 515-*c* via the sidelink connection 530-*a*. In some cases, the UE 515-*a* may send generated coding parameters information 545 to the other UEs 515. The UE 515-*b* and the UE 515-*c* may extract the generated set of network coding parameters 510 and decode the network coded packets 535. The UE 515-*b* may provide feedback 540-*a* to the base station 505 indicating a successful decoding of the first data packet and the second data packet, and the UE 515-*c* may provide feedback 540-*a* to the base station 505 indicating the successful decoding of the first data packet and the third data packet.

Figure 6:
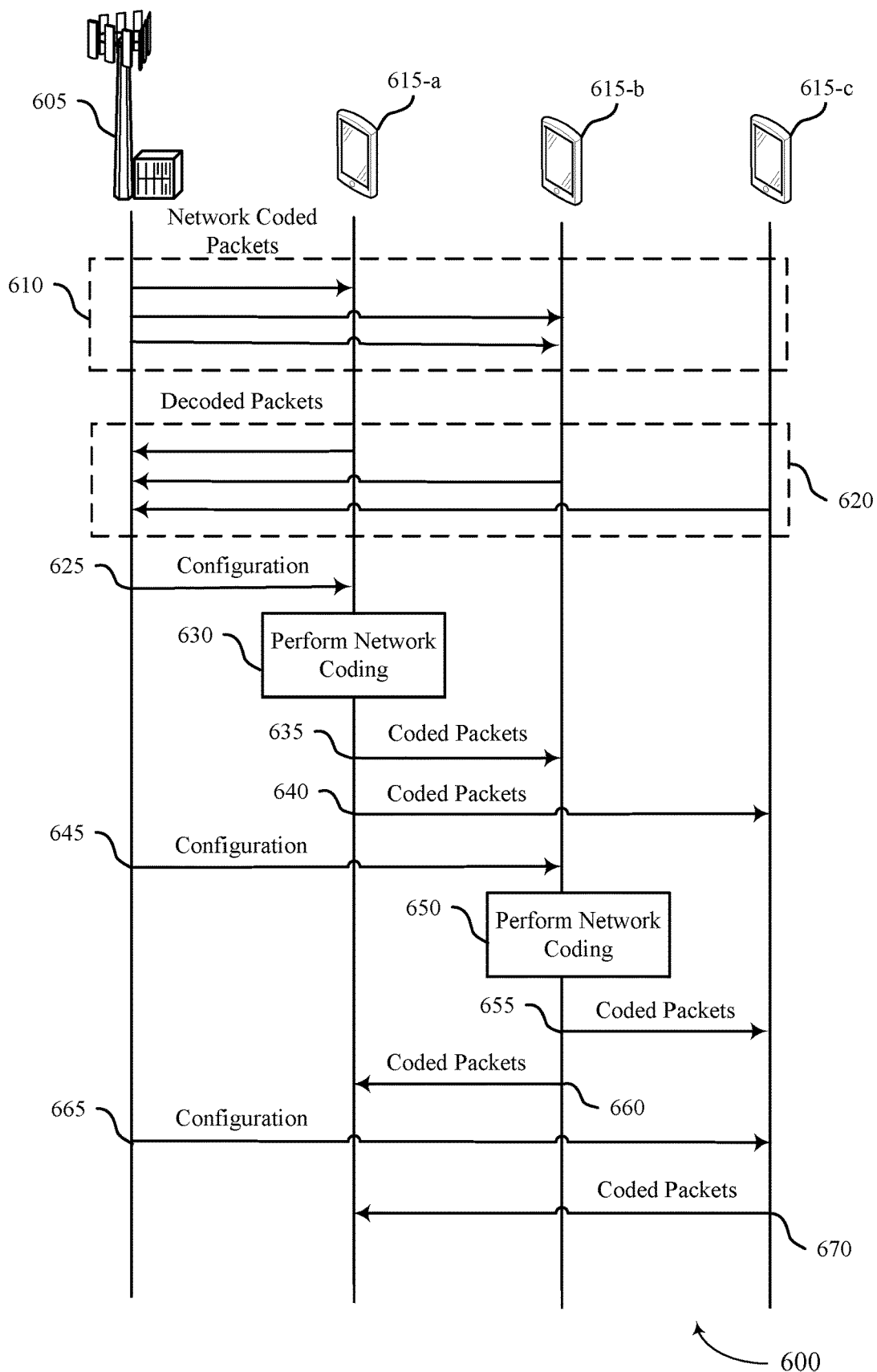
FIGS. 6 and 7 illustrate examples of a process flow that supports network coding sidelink data transmission in accordance with aspects of the present disclosure.

FIG. 6 illustrates an example of a process flow 600 that supports network coding sidelink data transmission in accordance with aspects of the present disclosure. In some examples, the process flow 600 may implement or may be implemented by aspects of a wireless communications system 100, a wireless communications system 200, a wireless communications system 300, a wireless communications system 400, and a wireless communications system 500. The process flow 600 may be performed by a base station 605 or a UE 615, or both. The base station 605 may be an example of a base station 105, a base station 205, a base station 305, a base station 405, or a base station 505 as described with reference to FIGS. 1 through 5, and UEs 615 may be examples of UEs 115, UEs 215, UEs 315, UEs 415, or UEs 515 as described with reference to FIGS. 1 and 2.

The UEs 615 may utilize network coding for sidelink communications, for example to relay and obtain information from the base station 605. The base station 605 may configure sidelink connections between the UEs 615 and, in some cases, configure communications on the sidelink connections. To utilize network coding, network coding parameters may be synchronized between the base station 605 and the UEs 615. For example, the UEs 615 may obtain network coding parameters from the base station 605. In some examples, the UEs 615 may receive one or more sets of network coding parameters from the base station 605 for network coded communications over a direct link, sidelink connections, or both. In some examples, the UEs 615 may receive multiple sets of network coding parameters, and the UEs 615 may be configured to use one of the sets of network coding parameters for network coded communications on the direct link communications and a different set of network coding parameters for network coded communications on the sidelink connections.

Additionally, or alternatively, the UEs 615 may generate network coding parameters for network coded sidelink communications. Alternative examples of the following may be implemented, where some steps are performed in a different order then described or are not performed at all. In some cases, step may include additional features not mentioned below, or further steps may be added.

At 610, the base station 605 may transmit network coded packets to the UE 615-*a*, the UE 615-*b*, and the UE 615-*c*. In some examples, the network coded packets may be based on a set of data packets, where the set of data packets may include a first data packet, a second data packet, and a third data packet (e.g., p1, p2, and p3). For example, the base station 605 may transmit a function of p1, p2, and p3 (e.g., f(p1, p2, p3)) to the UE 615-*a*, the UE 615-*b*, and the UE 615-*c*, where the function is an encoding function. In some examples, the UEs 615 may decode only a portion of the set of data packets. For example, the UE 615-*a* may decode p1 and p3, the UE 615-*b* may decode p2 and p3, and the UE 615-*c* may decode p3.

At 620, the UEs 615 may provide feedback to the base station 605 for the decoded data packets. For example, the UE 615-*a* may indicate that p1 and p3 were decoded, the UE 615-*b* may indicate p2 and p3 were decoded, and the UE 615-*c* may indicate p3 was decoded to the base station 605. Feedback may enable the base station 605 to determine which data packets the UEs 615 are missing, and which of the UEs 615 may be able to provide the missing packets. For example, the base station 605 may determine that the UE 615-*a* is missing p2, the UE 615-*b* is missing p1, and the UE 615-*c* is missing p1 and p2.

At 625, the base station 605 may transmit a configuration to the UE 615-*a*. In some examples, the configuration may instruct the UE 615-*a* to perform network coding on p1 and p3 and transmit a function of p1 and p3 to the UE 615-*b* and the UE 615-*c*.

At 630, UE 615-*a* may perform network coding on p1 and p3 using network coding parameters. In some cases, the network coding parameters may be configured by the base station 605 or generated at the UE 615-*a*. At 635-*a*, the UE 615-*a* may transmit the function of p1 and p3 to the UE 615-*b*.

At 640, the UE 615-*a* may transmit the function of p1 and p3 to the UE 615-*c*. In some cases, the UE 615-*b* and the UE 615-*c* may decode the network coded packets to obtain p3. In some cases, the UE 615-*b* and the UE 615-*c* may use the previously decoded p1 to obtain p3 from the network coded packets.

At 645, the base station 605 may transmit a configuration to the UE 615-*b*. In some examples, the configuration may instruct the UE 615-*b* to perform network coding on p2 and p3 and transmit a function of p2 and p3 to the UE 615-*a* and transmit p2 to the UE 615-*c*. At 650, the UE 615-*b* may perform network coding on p2 and p3 using network coding parameters. As described above, the network coding parameters may be configured by the base station 605 or generated at the UE 615-*b*. In some cases, at 655, the UE 615-*b* may transmit p2 to the UE 615-*c*. At 660, the UE 615-*b* may transmit the function of p2 and p3 to UE 615-*a*. At 665, the base station 605 may transmit a configuration to the UE 615-*c*. In some examples, the configuration may instruct the UE 615-*c* to transmit p3 to the UE 615-*a*. At 670, the UE 615-*a* may transmit p3 to UE 615-*a*.

In some examples, steps 625 through 670 may be repeated until the UE 615-*a*, the UE 615-*b*, and the UE 615-*c* successfully decode all of the data packets of the set of data packets.

Figure 7:
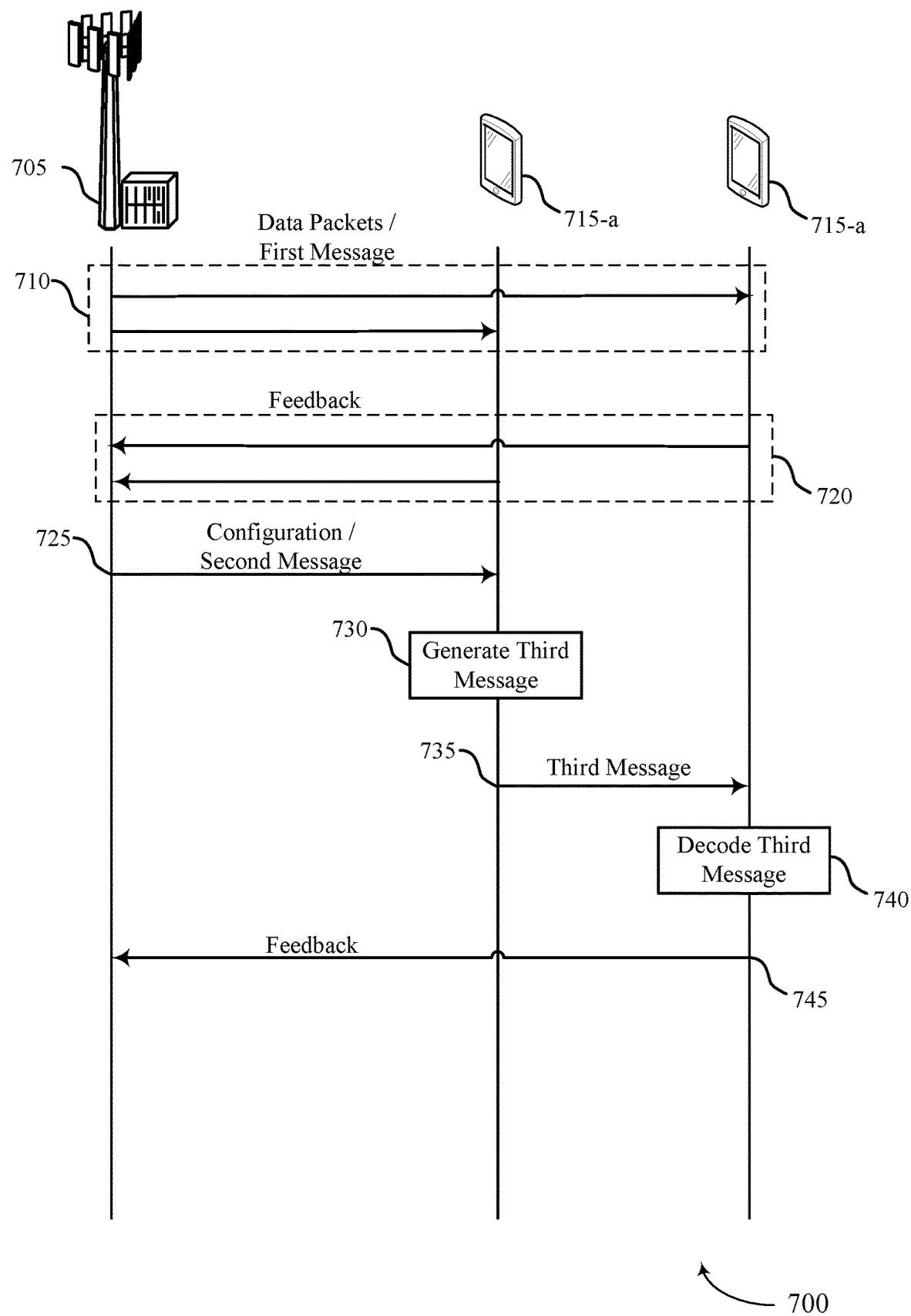

FIG. 7 illustrates an example of a process flow 700 that supports network coding sidelink data transmission in accordance with aspects of the present disclosure. In some examples, the process flow 700 may implement or may be implemented by aspects of a wireless communications system 100, a wireless communications system 200, a wireless communications system 300, a wireless communications system 400, a wireless communications system 500, or a process flow 600. The process flow 700 may be performed by a base station 705 or a UE 715, or both, which may be respective examples of a base station 105, a base station 205, a base station 305, a base station 405, a base station 505, or a base station 605 and a UE 115, a UE 215, a UE 315, a UE 415, a UE 515, or a UE 615 as described with reference to FIGS. 1 through 6.

The base station 705 may configure a sidelink connection for the UE 715-*a* and the UE 715-*b*. The base station 705 and the UEs 715 may support network coded communications on the sidelink connection between UEs 715.

At 710, the base station 705 may transmit a first message including a set of data packets to the UE 715-*a* and the UE 715-*b*. In some examples, the set of data packets may be network coded packets. the UE 715-*a* and the UE 715-*b* may attempt to decode the data packets. In some cases, the UE 715-*a* may decode the set of data packets, and the UE 715-*a* may unsuccessfully decode a portion of the set of data packets.

At 720, the UE 715-*a* and the UE 715-*b* may provide feedback for the set of data packets. For example, the UE 715-*a* may transmit feedback, based on the first message, indicating that the UE 715-*a* successfully decoded the set of network coded packets of the first message. The UE 715-*b* may transmit, based on the first message, feedback indicating that the UE 715-*b* unsuccessfully decoded the set of network coded packets of the first message. Based on the feedback, the base station 705 may determine that the UE 715-*a* successfully decoded a first group of the set of network coded packets and the UE 715-*b* unsuccessfully decoded a second group of the set of network coded packets.

At 725, the base station 705 may transmit, to the UE 715-*a* based on receiving the feedback, a second message including a network coding configuration and configuring the UE 715-*a* to transmit a third message including information in the second group of the set of network coded packets of the first message to the UE 715-*b* on the sidelink connection.

In some examples, the base station 705 may transmit, to the UE 715-*a* and the UE 715-*b*, an indication of one or more sets of network coding parameters. The one or more sets of network coding parameters may be associated with the first message (e.g., network coded packets transmitted on a direct link), the third message (e.g., network coded packets transmitted on the sidelink connection), or both. A set of network coding parameters may include a network coding algorithm, an encoding function, an encoding matrix, a number of decoding iterations, or any combination thereof.

At 730, the UE 715-*a* may generate the third message including information in the set of network coded packets of the first message based on the network coding configuration in the second message. For example, the UE 715-*a* may generate network coded packets based on information which the UE 715-*b* unsuccessfully decoded from the first message. For example, the third message may be generated based on the information in the second group of the set of network coded packets. In some cases, the UE 715-*a* may generate the third message using a set of network coded parameters indicated by the base station 705. In some cases, the UE 715-*a* may determine a set of network coded parameters and generate the third message based on the determined set of network coded parameters.

At 735, the UE 715-*a* may transmit the third message to UE 715-*b* on the sidelink connection. In some cases, UE 715-*a* may indicate the set of network coding parameters used to generate the third message to the UE 715-*b*. At 740, the UE 715-*b* may decode the third message based on the network coding configuration. In some cases, the UE 715-*b* may determine, or extract, the set of network coding parameters used to generate the third message to decode the third message.

At 745, the UE 715-*b* may transmit feedback for the third message indicating that the UE 715-*b* successfully decoded the information in the set of network coded packets of the first message. In some examples, the UE 715-*b* may provide the feedback to the UE 715-*a*, and the UE 715 may send the feedback for the third message to the base station 705. By implementing the process flow 700, the UE 715-*b* may efficiently and reliably decode all of the data packets transmitted in the third message by receiving network coded information of the missing data packets from the UE 715-*a* on the sidelink connection.

Figure 8:
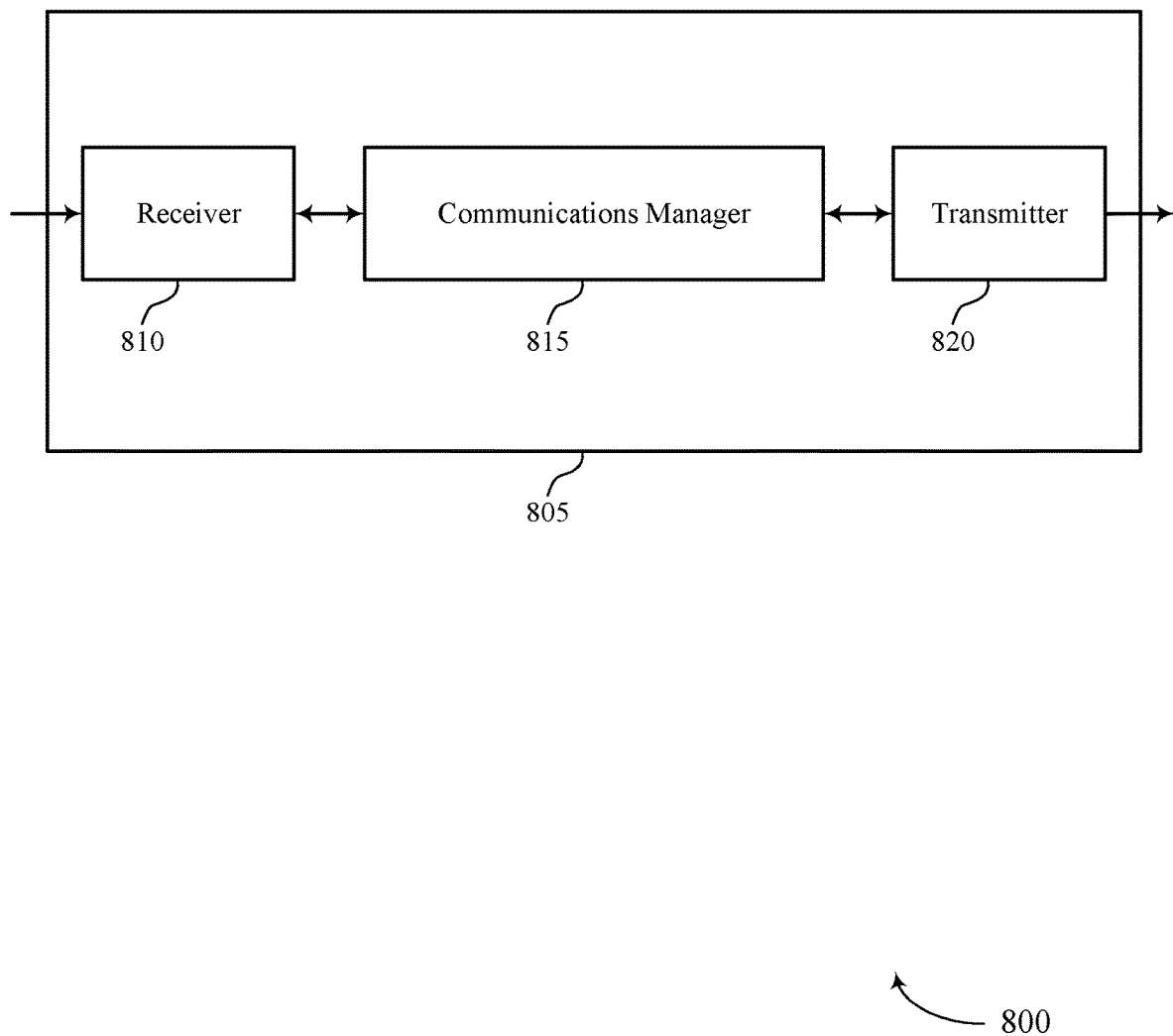
FIGS. 8 and 9 show block diagrams of devices that support network coding sidelink data transmission in accordance with aspects of the present disclosure.

FIG. 8 shows a block diagram 800 of a device 805 that supports network coding sidelink data transmission in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to network coding sidelink data transmission). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a first device, a first message including a set of network coded packets. The communications manager 815 may transmit feedback, based on the first message, indicating that the second device successfully decoded the set of network coded packets of the first message. The communications manager 815 may receive, from the first device based on the feedback, a second message including a network coding configuration and configuring the second device to transmit a third message including information in the set of network coded packets of the first message to a third device on a sidelink connection. The communications manager 815 may generate the third message including the information in the set of network coded packets based on the network coding configuration in the second message. The communications manager 815 may transmit, to the third device on the sidelink connection, the third message including the information in the set of network coded packets of the first message.

The communications manager 815 may also receive, from a first device, a first message including a set of network coded packets. The communications manager 815 may transmit, based on the first message, feedback indicating that the third device unsuccessfully decoded the set of network coded packets of the first message. The communications manager 815 may receive, from a second device on a sidelink connection, a second message including information in the set of network coded packets of the first message. The communications manager 815 may decode the second message based on a network coding configuration. The communications manager 815 may transmit feedback for the second message indicating that the third device successfully decoded the information in the set of network coded packets of the first message. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 815 as described herein may be implemented to realize one or more potential advantages. One implementation may allow a UE 115 to efficiently and reliably obtain data packets which were unsuccessfully decoded in an initial transmission. By utilizing network coding on a sidelink, the UE 115 may efficiently and reliably obtain data packets. For example, using network coding may be faster than retransmitting each individual data packet. Additionally, using network coding procedures may increase the likelihood of successfully decoding a packet in poor or lossy channel conditions.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
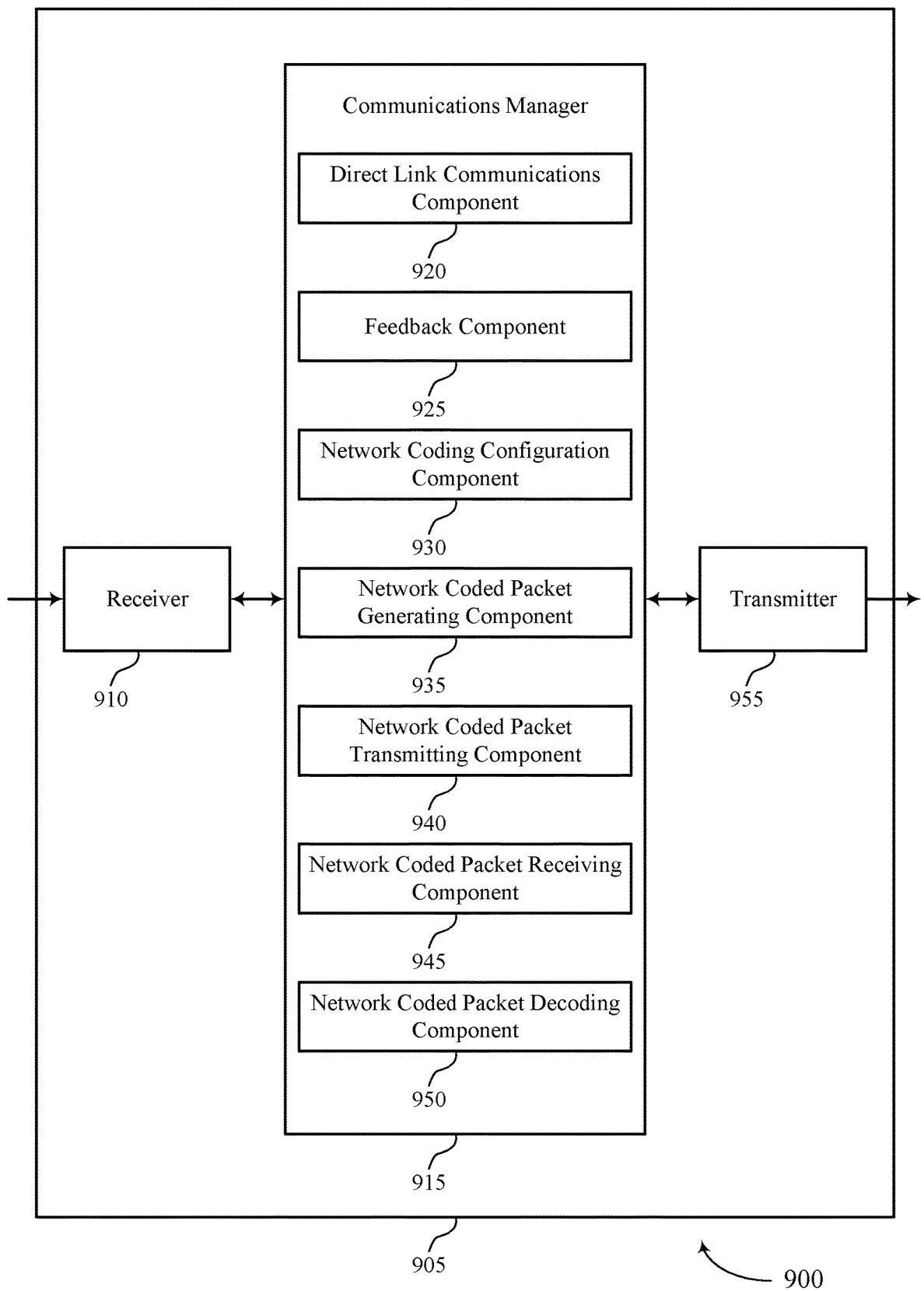

FIG. 9 shows a block diagram 900 of a device 905 that supports network coding sidelink data transmission in accordance with aspects of the present disclosure. The device 905 may be an example of aspects of a device 805, or a UE 115 as described herein. The device 905 may include a receiver 910, a communications manager 915, and a transmitter 955. The device 905 may also include a processor. Each of these components may be in communication with one another (e.g., via one or more buses).

The receiver 910 may receive information such as packets, user data, or control information associated with various information channels (e.g., control channels, data channels, and information related to network coding sidelink data transmission). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a direct link communications component 920, a feedback component 925, a network coding configuration component 930, a network coded packet generating component 935, a network coded packet transmitting component 940, a network coded packet receiving component 945, and a network coded packet decoding component 950. The communications manager 915 may be an example of aspects of the communications manager 1110 described herein.

The direct link communications component 920 may receive, from a first device, a first message including a set of network coded packets. The feedback component 925 may transmit feedback, based on the first message, indicating that the second device successfully decoded the set of network coded packets of the first message. The network coding configuration component 930 may receive, from the first device based on the feedback, a second message including a network coding configuration and configuring the second device to transmit a third message including information in the set of network coded packets of the first message to a third device on a sidelink connection. The network coded packet generating component 935 may generate the third message including the information in the set of network coded packets based on the network coding configuration in the second message. The network coded packet transmitting component 940 may transmit, to the third device on the sidelink connection, the third message including the information in the set of network coded packets of the first message.

The direct link communications component 920 may receive, from a first device, a first message including a set of network coded packets. The feedback component 925 may transmit, based on the first message, feedback indicating that the third device unsuccessfully decoded the set of network coded packets of the first message and transmit feedback for the second message indicating that the third device successfully decoded the information in the set of network coded packets of the first message. The network coded packet receiving component 945 may receive, from a second device on a sidelink connection, a second message including information in the set of network coded packets of the first message. The network coded packet decoding component 950 may decode the second message based on a network coding configuration.

The transmitter 955 may transmit signals generated by other components of the device 905. In some examples, the transmitter 955 may be collocated with a receiver 910 in a transceiver component. For example, the transmitter 955 may be an example of aspects of the transceiver 1120 described with reference to FIG. 11. The transmitter 955 may utilize a single antenna or a set of antennas.

Figure 10:
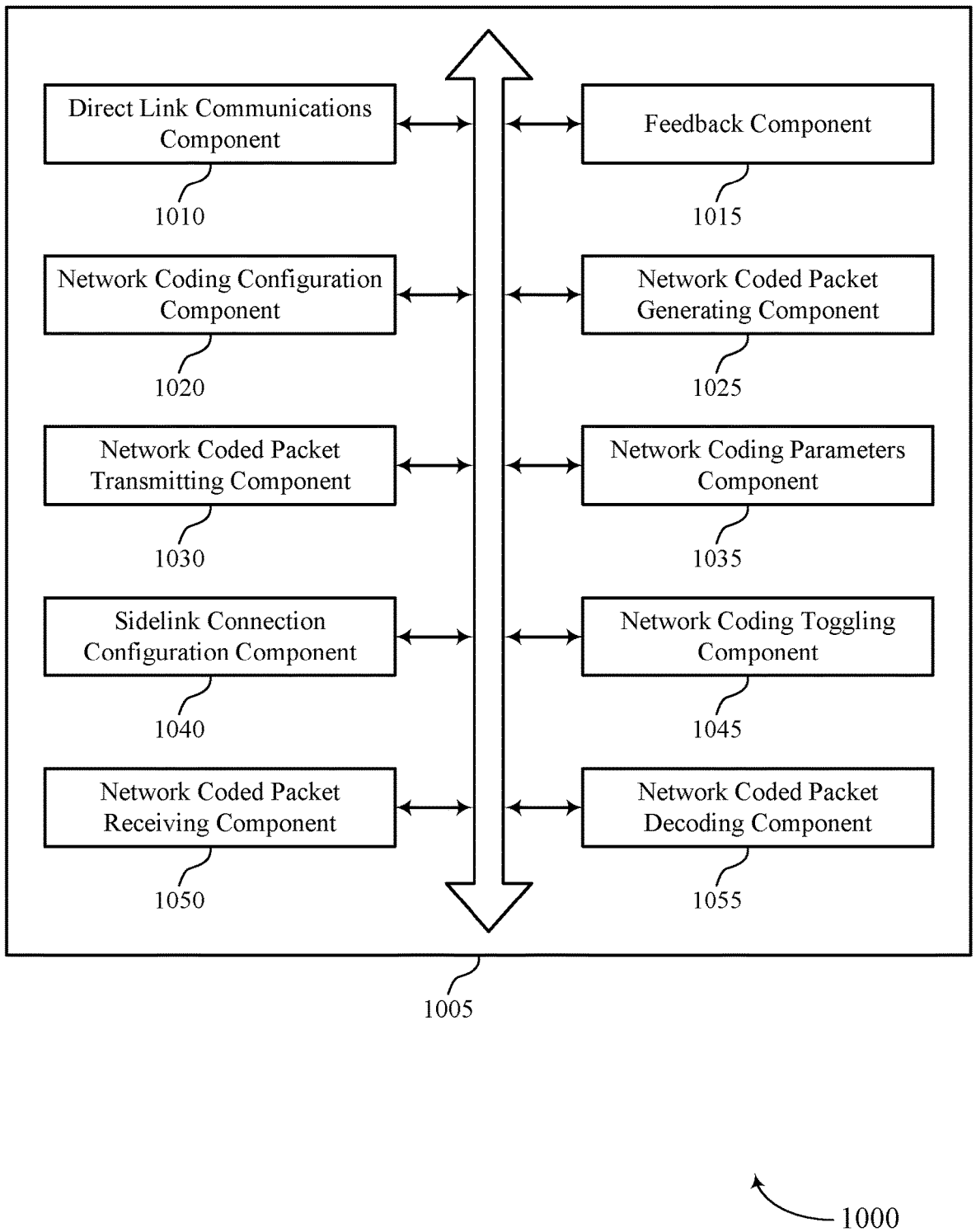
FIG. 10 shows a block diagram of a communications manager that supports network coding sidelink data transmission in accordance with aspects of the present disclosure.

FIG. 10 shows a block diagram 1000 of a communications manager 1005 that supports network coding sidelink data transmission in accordance with aspects of the present disclosure. The communications manager 1005 may be an example of aspects of a communications manager 815, a communications manager 915, or a communications manager 1110 described herein. The communications manager 1005 may include a direct link communications component 1010, a feedback component 1015, a network coding configuration component 1020, a network coded packet generating component 1025, a network coded packet transmitting component 1030, a network coding parameters component 1035, a sidelink connection configuration component 1040, a network coding toggling component 1045, a network coded packet receiving component 1050, and a network coded packet decoding component 1055. Each of these components may communicate, directly or indirectly, with one another (e.g., via one or more buses).

The direct link communications component 1010 may receive, from a first device, a first message including a set of network coded packets. The feedback component 1015 may transmit feedback, based on the first message, indicating that the second device successfully decoded the set of network coded packets of the first message. In some examples, the feedback component 1015 may transmit, based on the first message, feedback indicating that the third device unsuccessfully decoded the set of network coded packets of the first message. In some examples, the feedback component 1015 may transmit feedback for the second message indicating that the third device successfully decoded the information in the set of network coded packets of the first message.

The network coding configuration component 1020 may receive, from the first device based on the feedback, a second message including a network coding configuration and configuring the second device to transmit a third message including information in the set of network coded packets of the first message to a third device on a sidelink connection. The network coded packet generating component 1025 may generate the third message including the information in the set of network coded packets based on the network coding configuration in the second message.

The network coded packet transmitting component 1030 may transmit, to the third device on the sidelink connection, the third message including the information in the set of network coded packets of the first message.

The network coded packet receiving component 1050 may receive, from a second device on a sidelink connection, a second message including information in the set of network coded packets of the first message. The network coded packet decoding component 1055 may decode the second message based on a network coding configuration. The network coding parameters component 1035 may identify a set of network coding parameters applied to the first message based at last in part on the network coding configuration, where generating the third message is based on the set of network coding parameters. In some examples, the network coding parameters component 1035 may receive an indication of the set of network coding parameters via RRC signaling, DCI, or a MAC-CE, where identifying the set of network coding parameters applied to the first message is based on receiving the indication of the set of network coding parameters.

In some examples, the network coding parameters component 1035 may receive, from the first device, a configuration including a set of sets of network coding parameters. In some examples, the network coding parameters component 1035 may identify a set of network coding parameters from the set of sets of network coding parameters based on the network coding configuration in the second message, where generating the third message is based on the identified set of network coding parameters.

In some examples, the network coding parameters component 1035 may generate a set of network coding parameters for the third message based on the network coding configuration, where generating the third message is based on the generated set of network coding parameters. In some examples, the network coding parameters component 1035 may receive, from the first device, an indication of one or more sets of network coding parameters associated with the set of network coded packets, where the one or more sets of network coding parameters include a network coding algorithm, an encoding function, an encoding matrix, a number of decoding iterations, or any combination thereof.

In some examples, the network coding parameters component 1035 may identify a set of network coding parameters applied to the first message based on the network coding configuration, where decoding the second message is based on the set of network coding parameters.

In some examples, the network coding parameters component 1035 may receive an indication of the set of network coding parameters via RRC signaling, the second message, DCI, or a MAC-CE, where identifying the set of network coding parameters applied to the first message is based on receiving the indication of the set of network coding parameters.

In some examples, the network coding parameters component 1035 may identify a set of network coding parameters from the set of sets of network coding parameters based on the second message and the network coding configuration, where decoding the second message is based on the identified set of network coding parameters.

In some examples, the network coding parameters component 1035 may receive an indication of a set of network coding parameters used to generate the second message, where decoding the second message is based on the set of network coding parameters. In some examples, the network coding parameters component 1035 may receive, from the first device, an indication of one or more sets of network coding parameters associated with the set of network coded packets, where the one or more sets of network coding parameters include a network coding algorithm, an encoding function, an encoding matrix, a number of decoding iterations, or any combination thereof.

In some cases, the set of network coding parameters used to generate the third message is different than another set of network coding parameters applied to the first message. In some cases, the indication of the one or more sets of network coding parameters is received via a MAC-CE, DCI, RRC signaling, or any combination thereof. In some cases, the set of network coding parameters used to generate the second message is different than another set of network coding parameters applied to the first message. In some cases, the network coding configuration is received from the second device as part of the second message.

The sidelink connection configuration component 1040 may receive, from the first device, a configuration for the sidelink connection between the second device and the third device, where the second message is received from the first device based on receiving the configuration for the sidelink connection.

In some examples, the sidelink connection configuration component 1040 may report one or more connected neighboring devices, changes to the one or more connected neighboring devices, lost connections to the one or more neighboring devices, one or more channel condition changes, one or more connection requests, or any combination thereof.

In some examples, the sidelink connection configuration component 1040 may receive, from the first device, a configuration for the sidelink connection between the second device and the third device where the second message is received from the second device based on receiving the configuration for the sidelink connection.

In some examples, the sidelink connection configuration component 1040 may report one or more connected neighboring devices, changes to the one or more connected neighboring devices, lost connections with the one or more neighboring devices, one or more channel condition changes, one or more connection requests, or any combination thereof.

The network coding toggling component 1045 may report a sidelink channel quality to the first device. In some examples, network coding toggling component 1045 may receive an indication to enable or disable a network coding scheme for the sidelink connection based on the sidelink channel quality satisfying a sidelink channel quality threshold, where the second message includes the network coding configuration based on the indication to enable the network coding scheme.

In some examples, the network coding toggling component 1045 may determine an overhead budget satisfies an overhead budget threshold, where the network coding scheme is enabled or disabled based on the overhead budget satisfying the overhead budget threshold. In some examples, the network coding toggling component 1045 may determine a sidelink channel quality of the sidelink connection.

In some examples, the network coding toggling component 1045 may receive, from the first device, an indication to enable or disable the network coding scheme via a MAC-CE, DCI, or both based on the request. In some examples, transmitting, to the first device, a request to enable or disable a network coding scheme for the sidelink connection based on the sidelink channel quality satisfying a channel quality threshold, where the second message includes the network coding configuration based on the request to enable the network coding scheme.

In some examples, the network coding toggling component 1045 may receive, from the first device, an indication to enable or disable the network coding scheme via a MAC-CE element, DCI, or both based on the request. In some cases, the indication to enable or disable the network coding scheme is received via a MAC-CE, DCI, or both. In some cases, the request to enable or disable the network coding scheme is transmitted via a MAC-CE, UCI, or both.

Figure 11:
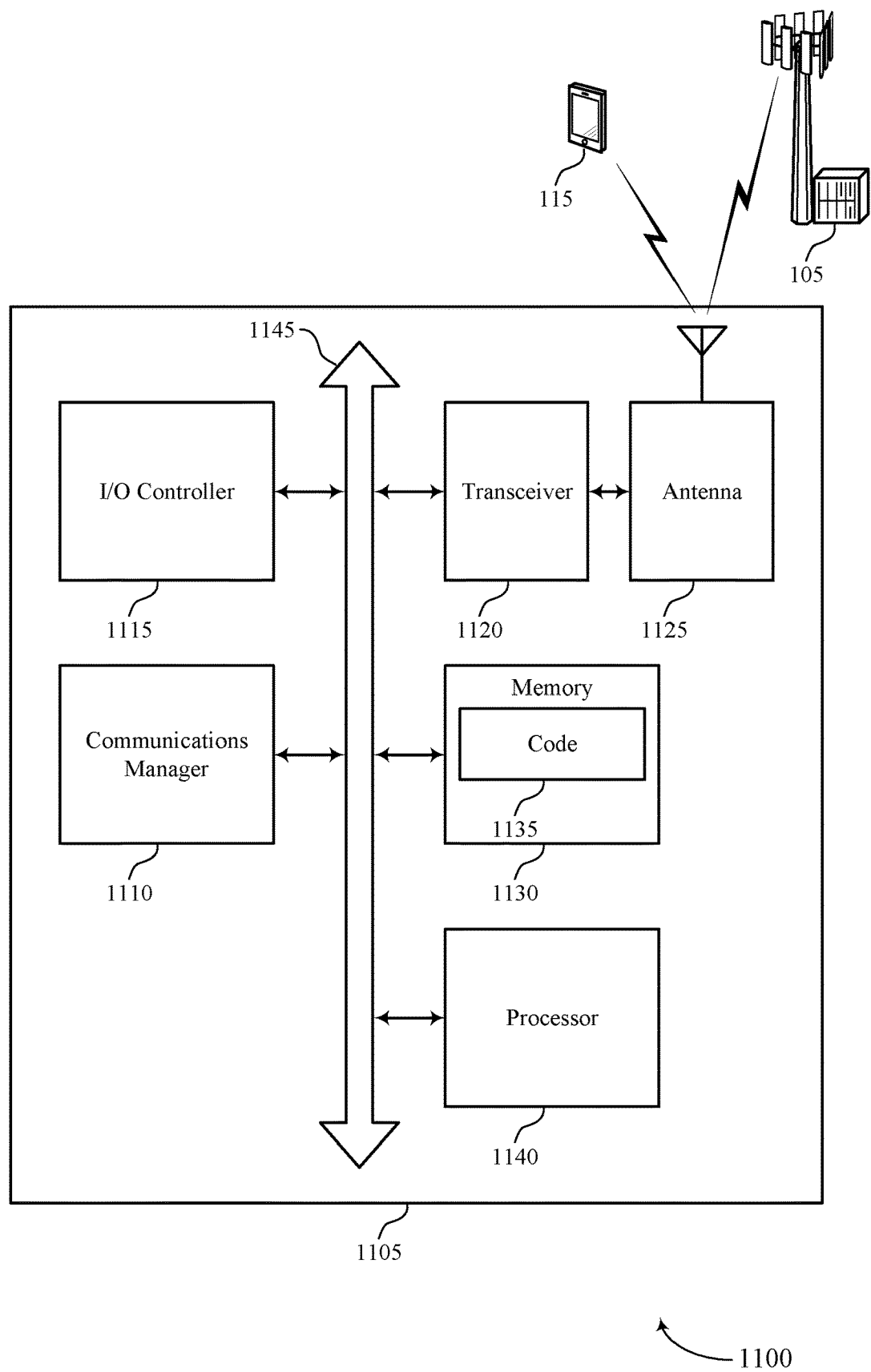
FIG. 11 shows a diagram of a system including a device that supports network coding sidelink data transmission in accordance with aspects of the present disclosure.

FIG. 11 shows a diagram of a system 1100 including a device 1105 that supports network coding sidelink data transmission in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a first device, a first message including a set of network coded packets. The communications manager 1110 may transmit feedback, based on the first message, indicating that the second device successfully decoded the set of network coded packets of the first message. The communications manager 1110 may receive, from the first device based on the feedback, a second message including a network coding configuration and configuring the second device to transmit a third message including information in the set of network coded packets of the first message to a third device on a sidelink connection. The communications manager 1110 may generate the third message including the information in the set of network coded packets based on the network coding configuration in the second message. The communications manager 1110 may transmit, to the third device on the sidelink connection, the third message including the information in the set of network coded packets of the first message.

The communications manager 1110 may also receive, from a first device, a first message including a set of network coded packets. The communications manager 1110 may transmit, based on the first message, feedback indicating that the third device unsuccessfully decoded the set of network coded packets of the first message. The communications manager 1110 may receive, from a second device on a sidelink connection, a second message including information in the set of network coded packets of the first message. The communications manager 1110 may decode the second message based on a network coding configuration. The communications manager 1110 may transmit feedback for the second message indicating that the third device successfully decoded the information in the set of network coded packets of the first message The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a Basic Input/Output System (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting network coding sidelink data transmission).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
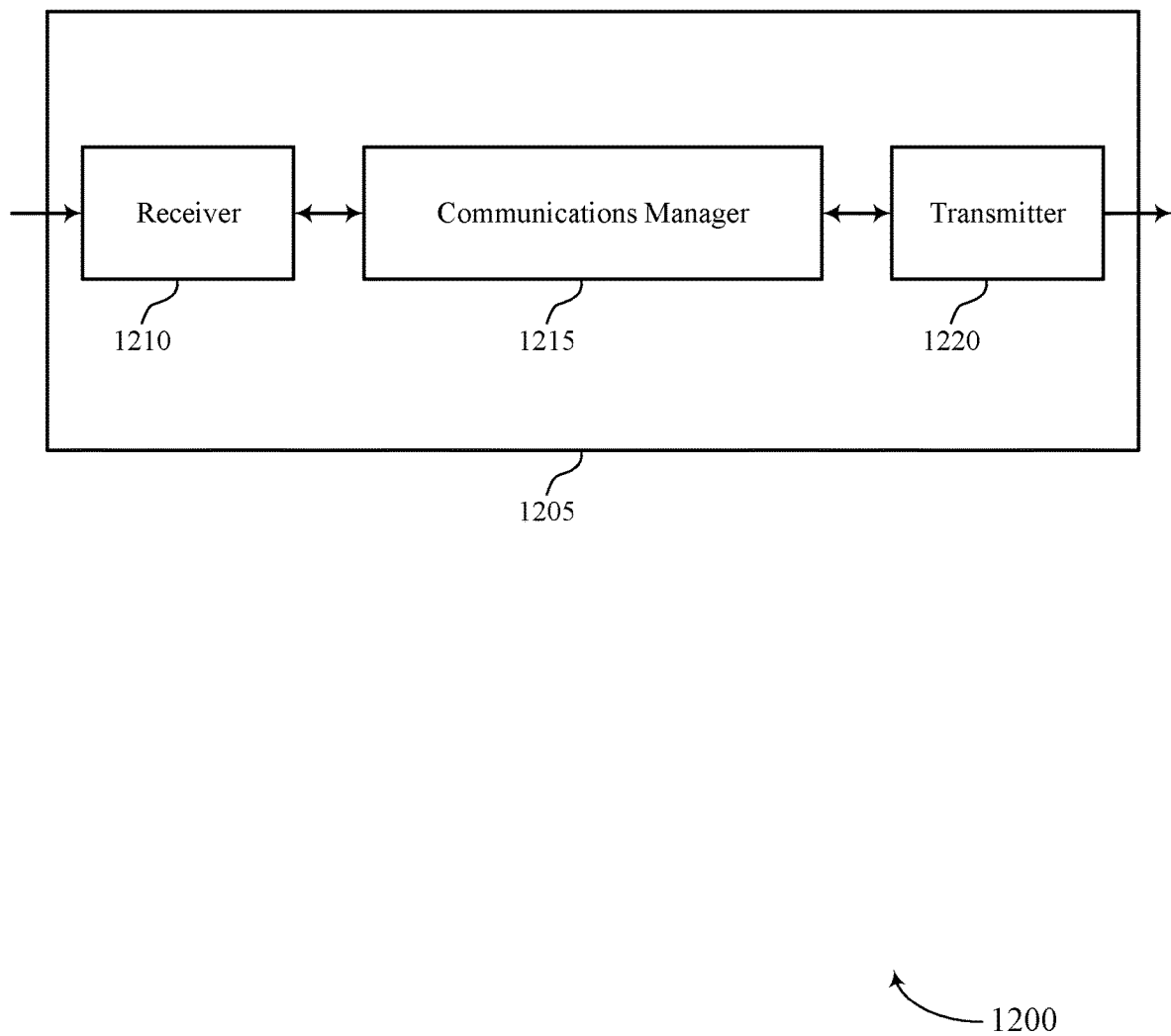
FIGS. 12 and 13 show block diagrams of devices that support network coding sidelink data transmission in accordance with aspects of the present disclosure.

FIG. 12 shows a block diagram 1200 of a device 1205 that supports network coding sidelink data transmission in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to network coding sidelink data transmission). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit a first message including a set of network coded packets to a second device and a third device. The communications manager 1215 may receive, based on the first message, feedback indicating that that the second device successfully decoded a first set of the set of network coded packets and that the third device unsuccessfully decoded a second set the set of network coded packets. The communications manager 1215 may receive, based on the second message, feedback indicating that the third device successfully decoded the information in the second set of the set of network coded packets. The communications manager 1215 may transmit, to the second device based on receiving the feedback, a second message including a network coding configuration and configuring the second device to transmit a third message including information in the second set of the set of network coded packets of the first message to the third device on a sidelink connection. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver component. For example, the transmitter 1220 may be an example of aspects of the transceiver 1520 described with reference to FIG. 15. The transmitter 1220 may utilize a single antenna or a set of antennas.

Figure 13:
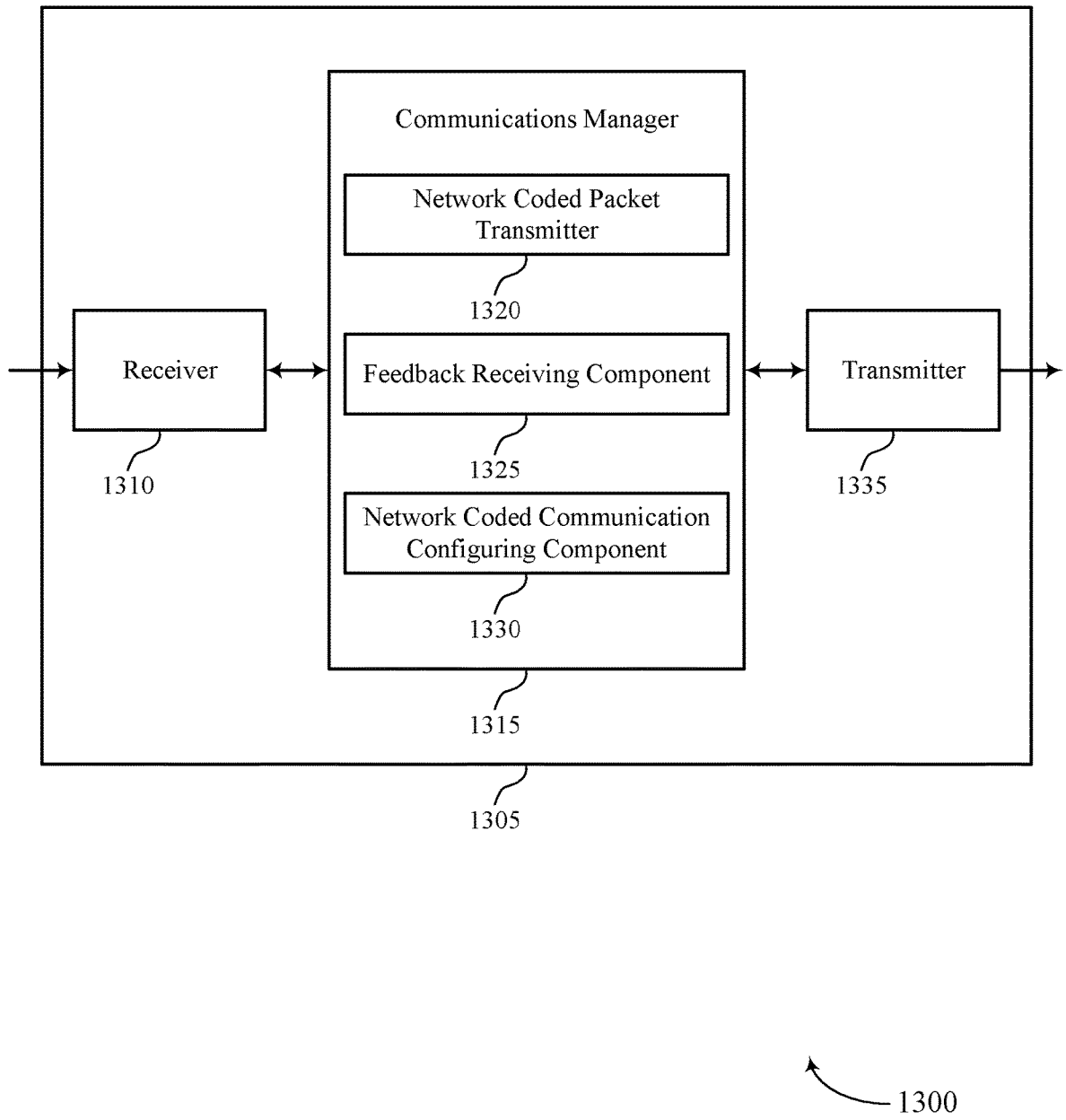

FIG. 13 shows a block diagram 1300 of a device 1305 that supports network coding sidelink data transmission in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to network coding sidelink data transmission). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a network coded packet transmitter 1320, a feedback receiving component 1325, and a network coded communication configuring component 1330. The communications manager 1315 may be an example of aspects of the communications manager 1510 described herein.

The network coded packet transmitter 1320 may transmit a first message including a set of network coded packets to a second device and a third device.

The feedback receiving component 1325 may receive, based on the first message, feedback indicating that that the second device successfully decoded a first set of the set of network coded packets and that the third device unsuccessfully decoded a second set the set of network coded packets and receive, based on the second message, feedback indicating that the third device successfully decoded the information in the second set of the set of network coded packets.

The network coded communication configuring component 1330 may transmit, to the second device based on receiving the feedback, a second message including a network coding configuration and configuring the second device to transmit a third message including information in the second set of the set of network coded packets of the first message to the third device on a sidelink connection.

The transmitter 1335 may transmit signals generated by other components of the device 1305. In some examples, the transmitter 1335 may be collocated with a receiver 1310 in a transceiver component. For example, the transmitter 1335 may be an example of aspects of the transceiver 1520 described with reference to FIG. 15. The transmitter 1335 may utilize a single antenna or a set of antennas.

Figure 14:
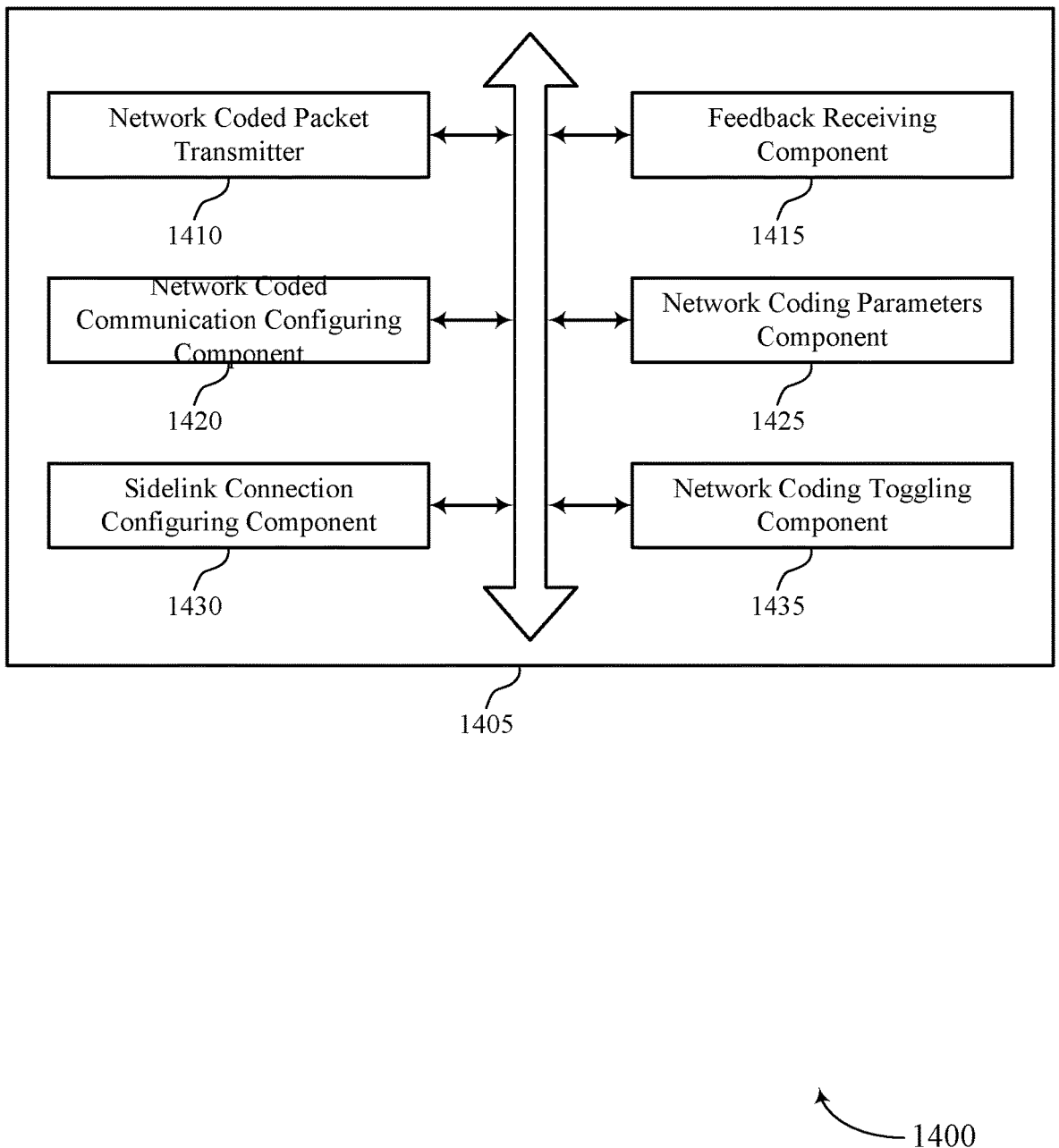
FIG. 14 shows a block diagram of a communications manager that supports network coding sidelink data transmission in accordance with aspects of the present disclosure.

FIG. 14 shows a block diagram 1400 of a communications manager 1405 that supports network coding sidelink data transmission in accordance with aspects of the present disclosure. The communications manager 1405 may be an example of aspects of a communications manager 1215, a communications manager 1315, or a communications manager 1510 described herein. The communications manager 1405 may include a network coded packet transmitter 1410, a feedback receiving component 1415, a network coded communication configuring component 1420, a network coding parameters component 1425, a sidelink connection configuring component 1430, and a network coding toggling component 1435. Each of these components may communicate, directly or indirectly, with one another (e.g., via one or more buses).

The network coded packet transmitter 1410 may transmit a first message including a set of network coded packets to a second device and a third device. The feedback receiving component 1415 may receive, based on the first message, feedback indicating that that the second device successfully decoded a first set of the set of network coded packets and that the third device unsuccessfully decoded a second set the set of network coded packets.

In some examples, the feedback receiving component 1415 may receive, based on the second message, feedback indicating that the third device successfully decoded the information in the second set of the set of network coded packets.

The network coded communication configuring component 1420 may transmit, to the second device based on receiving the feedback, a second message including a network coding configuration and configuring the second device to transmit a third message including information in the second set of the set of network coded packets of the first message to the third device on a sidelink connection.

The network coding parameters component 1425 may apply a set of network coding parameters to generate the first message. In some examples, the network coding parameters component 1425 may configure the second device to use the set of network coding parameters to generate the third message, where the network coding configuration indicates the set of network coding parameters.

In some examples, the network coding parameters component 1425 may configure the set of network coding parameters via RRC signaling, where the network coding configuration in the second message indicates to the second device to use the set of network coding parameters.

In some examples, the network coding parameters component 1425 may configure the second device and the third device with a set of sets of network coding parameters. In some examples, the network coding parameters component 1425 may select a set of network coding parameters from the set of sets of network coding parameters. In some examples, the network coding parameters component 1425 may transmit an indication the set of network coding parameters to the second device, where the network coding configuration indicates the set of network coding parameters.

In some examples, the network coding parameters component 1425 may transmit, to the second device and the third device, an indication of one or more sets of network coding parameters associated with the set of network coded packets, where the one or more sets of network coding parameters include a network coding algorithm, an encoding function, an encoding matrix, a number of decoding iterations, or any combination thereof. In some cases, the set of network coding parameters transmitted to the second device is different than another set of network coding parameters used to generate the first message.

In some cases, the network coding configuration includes an indication to generate a set of network coding parameters to apply for the third message. In some cases, the one or more sets of network coding parameters are indicated via a MAC-CE, DCI, RRC signaling, or any combination thereof.

The sidelink connection configuring component 1430 may configure the sidelink connection between the second device and the third device, the second message is transmitted to the second device based on configuring the sidelink connection. In some examples, the sidelink connection configuring component 1430 may configure the second device and the third device to report connected one or more neighboring devices, changes to the one or more connected neighboring devices, lost connections to the one or more neighboring devices, one or more channel condition changes, one or more connection requests, or any combination thereof.

The network coding toggling component 1435 may determine a sidelink channel quality based on feedback from the second device, the third device, or both. In some examples, the network coding toggling component 1435 may enable or disabling a network coding scheme for the sidelink connection based on the sidelink channel quality satisfying a sidelink channel quality threshold. In some examples, the network coding toggling component 1435 may determine an overhead budget satisfies an overhead budget threshold, where the network coding scheme is enabled or disabled based on the overhead budget satisfying the overhead budget threshold.

In some examples, the network coding toggling component 1435 may transmit, to the second device, the third device, or both, an indication that the network coding scheme is enabled or disabled via a MAC-CE element, DCI, or both. In some examples, receiving, from the second device or the third device, a request to enable or disable a network coding scheme for the sidelink connection based on a sidelink channel quality satisfying a channel quality threshold, where the second message includes the network coding configuration based on enabling the network coding scheme. In some examples, the network coding toggling component 1435 may transmit, to the second device, the third device, or both, an indication to enable or disable the network coding scheme via a MAC-CE, DCI, or both based on the request. In some cases, the request to enable or disable the network coding scheme is received via a MAC-CE, UCI, or both.

Figure 15:
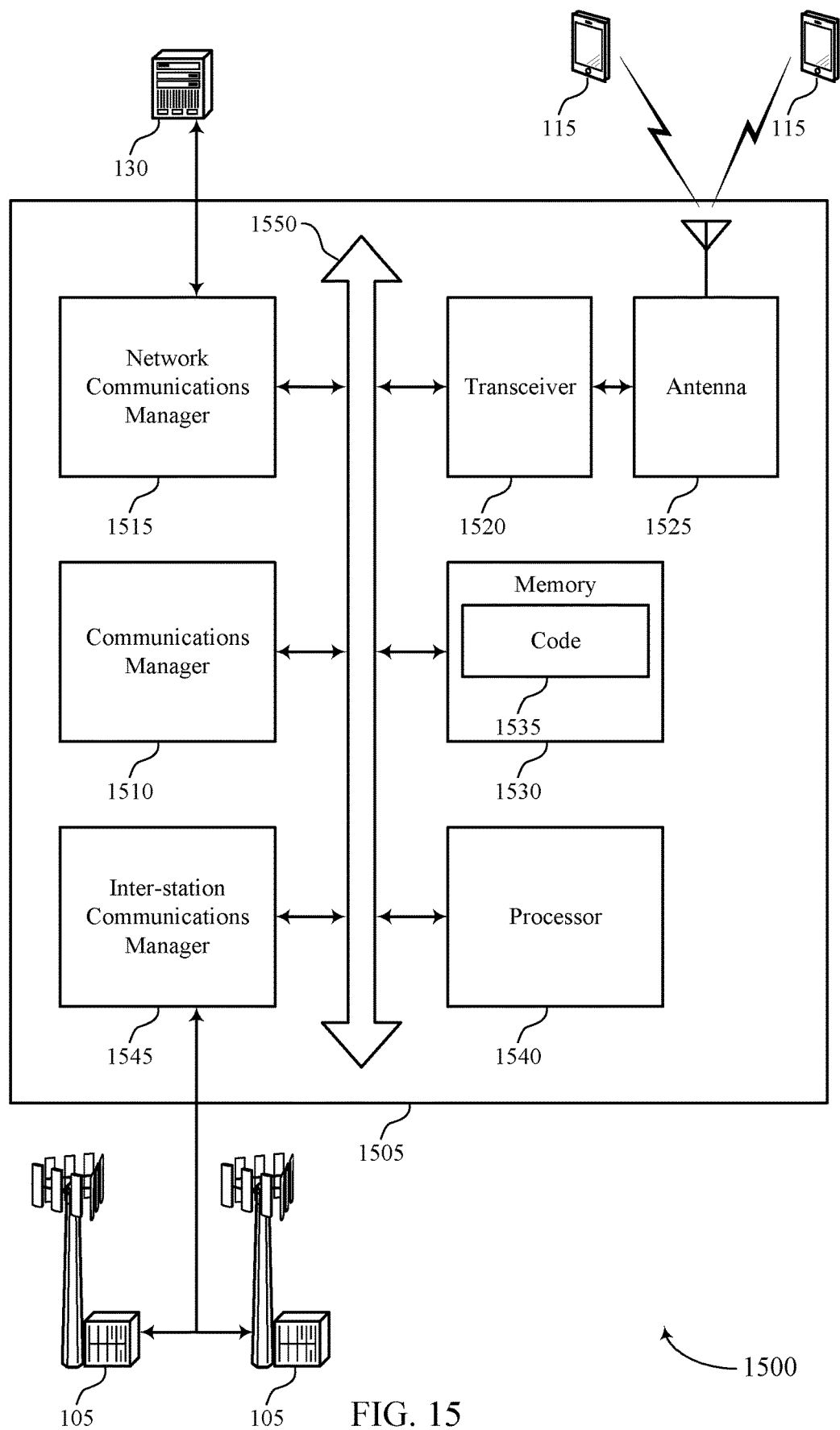
FIG. 15 shows a diagram of a system including a device that supports network coding sidelink data transmission in accordance with aspects of the present disclosure.

FIG. 15 shows a diagram of a system 1500 including a device 1505 that supports network coding sidelink data transmission in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a first message including a set of network coded packets to a second device and a third device. The communications manager 1510 may receive, based on the first message, feedback indicating that that the second device successfully decoded a first set of the set of network coded packets and that the third device unsuccessfully decoded a second set the set of network coded packets. The communications manager 1510 may receive, based on the second message, feedback indicating that the third device successfully decoded the information in the second set of the set of network coded packets. The communications manager 1510 may transmit, to the second device based on receiving the feedback, a second message including a network coding configuration and configuring the second device to transmit a third message including information in the second set of the set of network coded packets of the first message to the third device on a sidelink connection.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting network coding sidelink data transmission).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
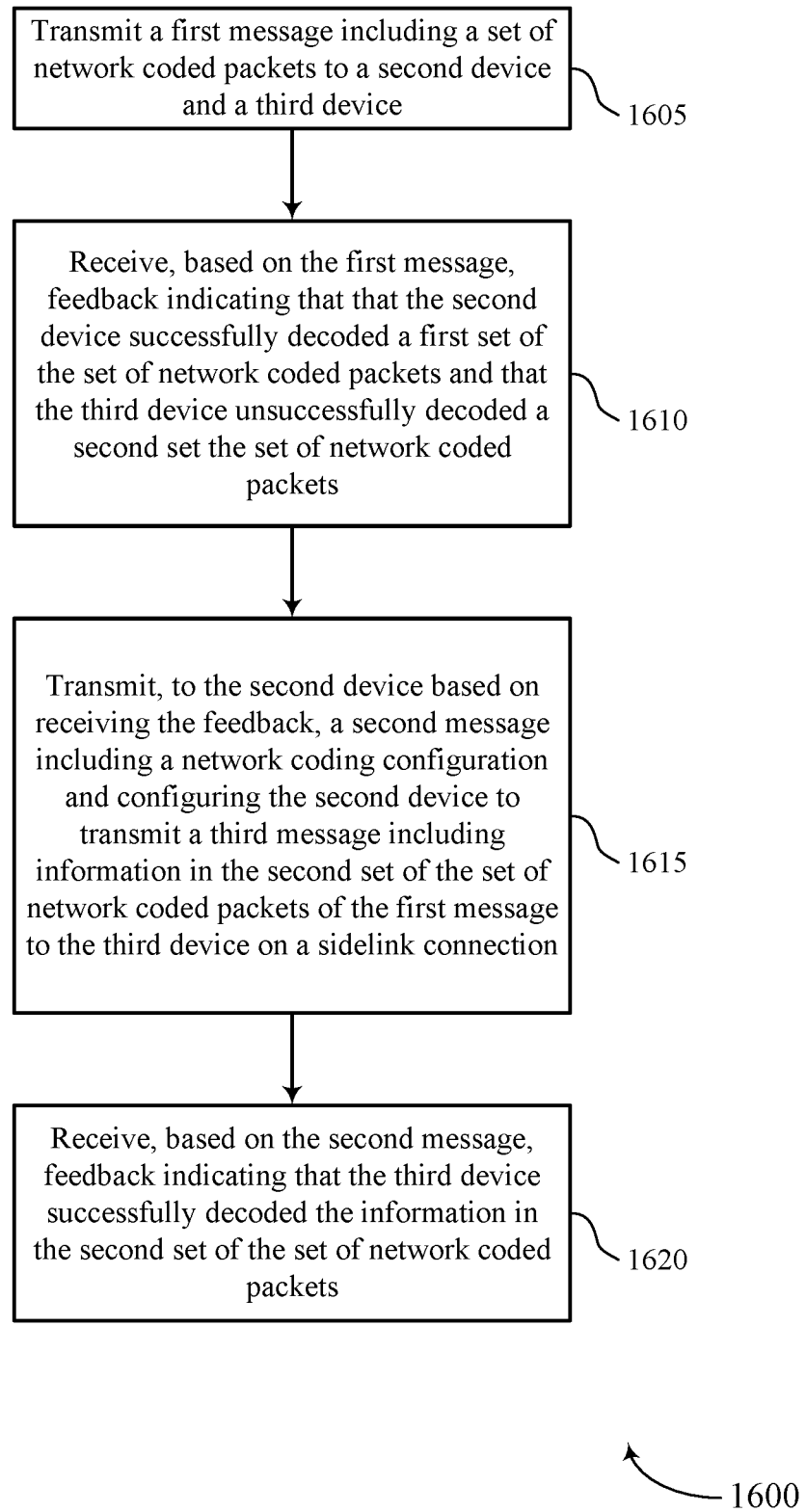
FIGS. 16 through 20 show flowcharts illustrating methods that support network coding sidelink data transmission in accordance with aspects of the present disclosure.

FIG. 16 shows a flowchart illustrating a method 1600 that supports network coding sidelink data transmission in accordance with aspects of the present disclosure. The operations of method 1600 may be implemented by a base station 105 or its components as described herein. For example, the operations of method 1600 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1605, the base station may transmit a first message including a set of network coded packets to a second device and a third device. The operations of 1605 may be performed according to the methods described herein. In some examples, aspects of the operations of 1605 may be performed by a network coded packet transmitter as described with reference to FIGS. 12 through 15.

At 1610, the base station may receive, based on the first message, feedback indicating that that the second device successfully decoded a first set of the set of network coded packets and that the third device unsuccessfully decoded a second set the set of network coded packets. The operations of 1610 may be performed according to the methods described herein. In some examples, aspects of the operations of 1610 may be performed by a feedback receiving component as described with reference to FIGS. 12 through 15.

At 1615, the base station may transmit, to the second device based on receiving the feedback, a second message including a network coding configuration and configuring the second device to transmit a third message including information in the second set of the set of network coded packets of the first message to the third device on a sidelink connection. The operations of 1615 may be performed according to the methods described herein. In some examples, aspects of the operations of 1615 may be performed by a network coded communication configuring component as described with reference to FIGS. 12 through 15.

At 1620, the base station may receive, based on the second message, feedback indicating that the third device successfully decoded the information in the second set of the set of network coded packets. The operations of 1620 may be performed according to the methods described herein. In some examples, aspects of the operations of 1620 may be performed by a feedback receiving component as described with reference to FIGS. 12 through 15.

Figure 17:
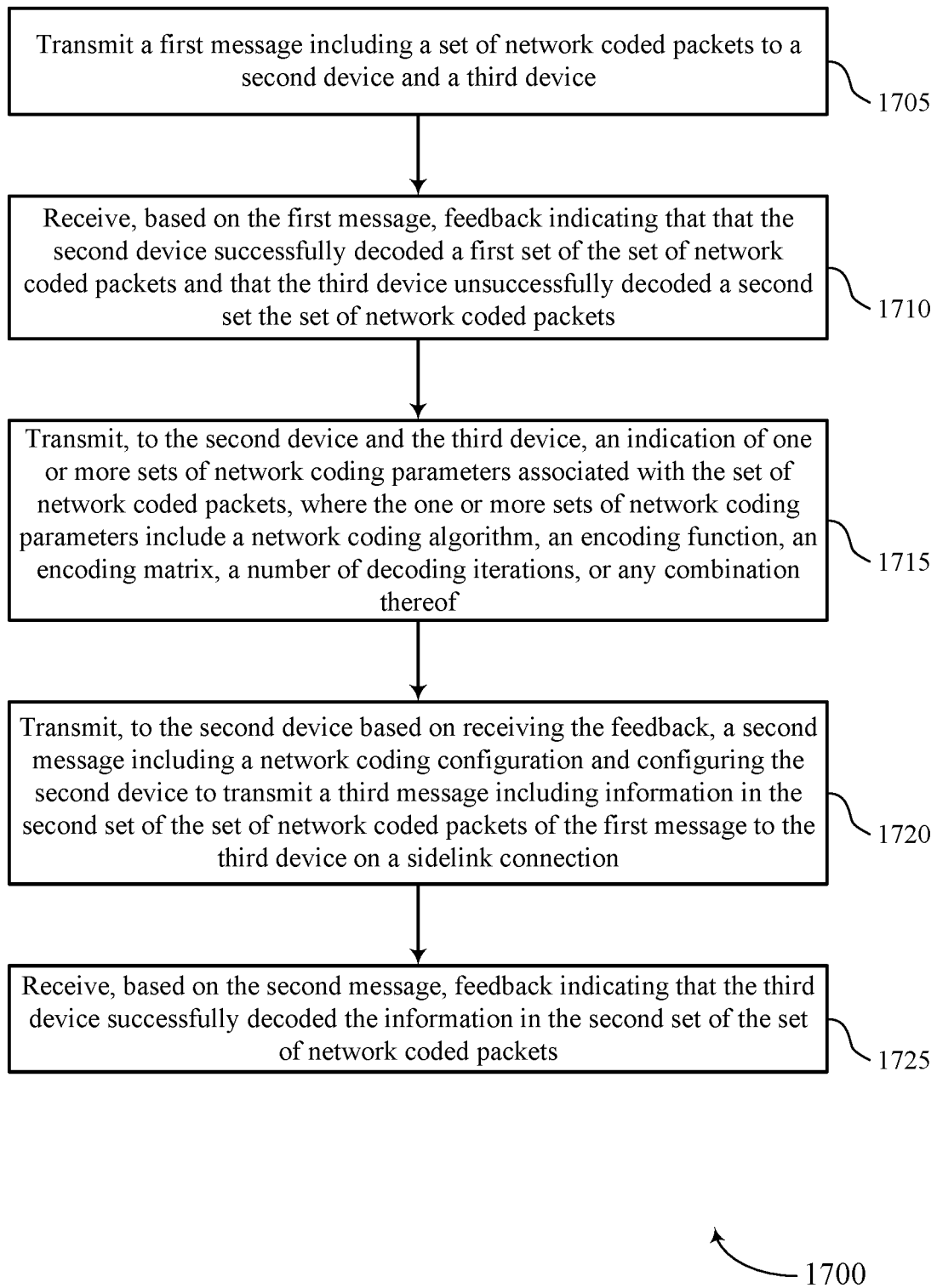

FIG. 17 shows a flowchart illustrating a method 1700 that supports network coding sidelink data transmission in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1705, the base station may transmit a first message including a set of network coded packets to a second device and a third device. The operations of 1705 may be performed according to the methods described herein. In some examples, aspects of the operations of 1705 may be performed by a network coded packet transmitter as described with reference to FIGS. 12 through 15.

At 1710, the base station may receive, based on the first message, feedback indicating that that the second device successfully decoded a first set of the set of network coded packets and that the third device unsuccessfully decoded a second set the set of network coded packets. The operations of 1710 may be performed according to the methods described herein. In some examples, aspects of the operations of 1710 may be performed by a feedback receiving component as described with reference to FIGS. 12 through 15.

At 1715, the base station may transmit, to the second device and the third device, an indication of one or more sets of network coding parameters associated with the set of network coded packets, where the one or more sets of network coding parameters include a network coding algorithm, an encoding function, an encoding matrix, a number of decoding iterations, or any combination thereof. The operations of 1715 may be performed according to the methods described herein. In some examples, aspects of the operations of 1715 may be performed by a network coding parameters component as described with reference to FIGS. 12 through 15.

At 1720, the base station may transmit, to the second device based on receiving the feedback, a second message including a network coding configuration and configuring the second device to transmit a third message including information in the second set of the set of network coded packets of the first message to the third device on a sidelink connection. The operations of 1720 may be performed according to the methods described herein. In some examples, aspects of the operations of 1720 may be performed by a network coded communication configuring component as described with reference to FIGS. 12 through 15.

At 1725, the base station may receive, based on the second message, feedback indicating that the third device successfully decoded the information in the second set of the set of network coded packets. The operations of 1725 may be performed according to the methods described herein. In some examples, aspects of the operations of 1725 may be performed by a feedback receiving component as described with reference to FIGS. 12 through 15.

Figure 18:
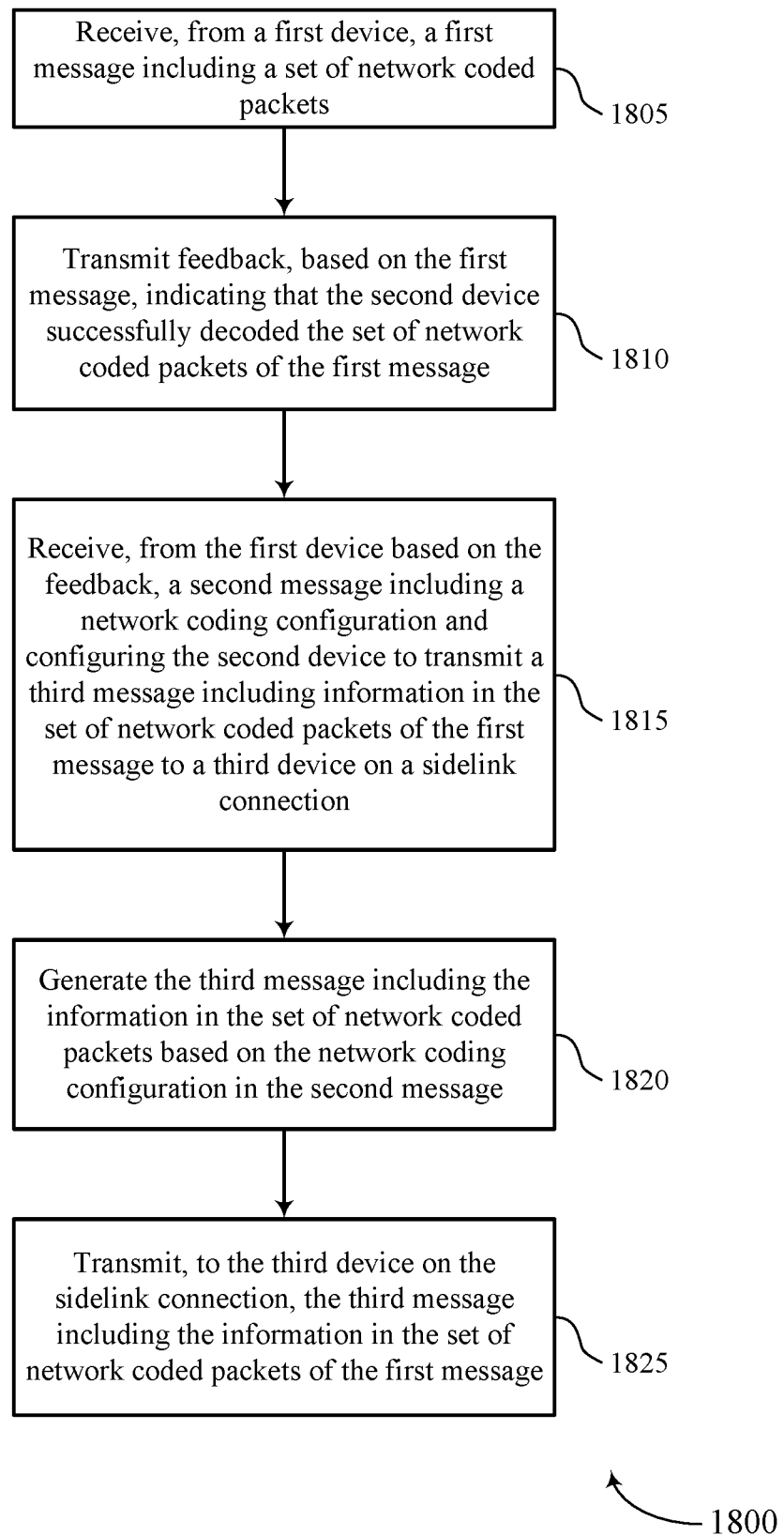

FIG. 18 shows a flowchart illustrating a method 1800 that supports network coding sidelink data transmission in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1805, the UE may receive, from a first device, a first message including a set of network coded packets. The operations of 1805 may be performed according to the methods described herein. In some examples, aspects of the operations of 1805 may be performed by a direct link communications component as described with reference to FIGS. 8 through 11.

At 1810, the UE may transmit feedback, based on the first message, indicating that the second device successfully decoded the set of network coded packets of the first message. The operations of 1810 may be performed according to the methods described herein. In some examples, aspects of the operations of 1810 may be performed by a feedback component as described with reference to FIGS. 8 through 11.

At 1815, the UE may receive, from the first device based on the feedback, a second message including a network coding configuration and configuring the second device to transmit a third message including information in the set of network coded packets of the first message to a third device on a sidelink connection. The operations of 1815 may be performed according to the methods described herein. In some examples, aspects of the operations of 1815 may be performed by a network coding configuration component as described with reference to FIGS. 8 through 11.

At 1820, the UE may generate the third message including the information in the set of network coded packets based on the network coding configuration in the second message. The operations of 1820 may be performed according to the methods described herein. In some examples, aspects of the operations of 1820 may be performed by a network coded packet generating component as described with reference to FIGS. 8 through 11.

At 1825, the UE may transmit, to the third device on the sidelink connection, the third message including the information in the set of network coded packets of the first message. The operations of 1825 may be performed according to the methods described herein. In some examples, aspects of the operations of 1825 may be performed by a network coded packet transmitting component as described with reference to FIGS. 8 through 11.

Figure 19:
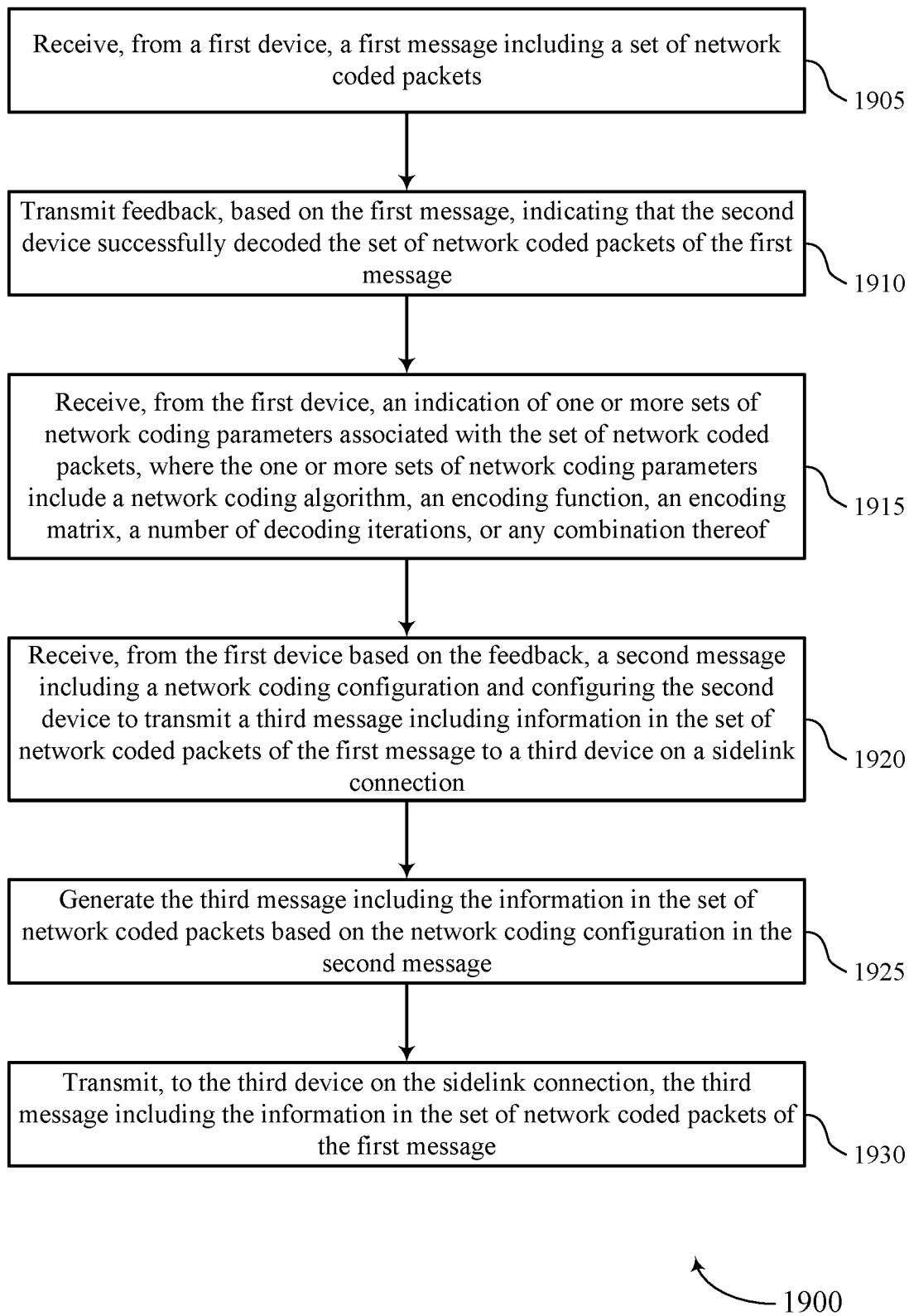

FIG. 19 shows a flowchart illustrating a method 1900 that supports network coding sidelink data transmission in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1905, the UE may receive, from a first device, a first message including a set of network coded packets. The operations of 1905 may be performed according to the methods described herein. In some examples, aspects of the operations of 1905 may be performed by a direct link communications component as described with reference to FIGS. 8 through 11.

At 1910, the UE may transmit feedback, based on the first message, indicating that the second device successfully decoded the set of network coded packets of the first message. The operations of 1910 may be performed according to the methods described herein. In some examples, aspects of the operations of 1910 may be performed by a feedback component as described with reference to FIGS. 8 through 11.

At 1915, the UE may receive, from the first device, an indication of one or more sets of network coding parameters associated with the set of network coded packets, where the one or more sets of network coding parameters include a network coding algorithm, an encoding function, an encoding matrix, a number of decoding iterations, or any combination thereof. The operations of 1915 may be performed according to the methods described herein. In some examples, aspects of the operations of 1915 may be performed by a network coding parameters component as described with reference to FIGS. 8 through 11.

At 1920, the UE may receive, from the first device based on the feedback, a second message including a network coding configuration and configuring the second device to transmit a third message including information in the set of network coded packets of the first message to a third device on a sidelink connection. The operations of 1920 may be performed according to the methods described herein. In some examples, aspects of the operations of 1920 may be performed by a network coding configuration component as described with reference to FIGS. 8 through 11.

At 1925, the UE may generate the third message including the information in the set of network coded packets based on the network coding configuration in the second message. The operations of 1925 may be performed according to the methods described herein. In some examples, aspects of the operations of 1925 may be performed by a network coded packet generating component as described with reference to FIGS. 8 through 11.

At 1930, the UE may transmit, to the third device on the sidelink connection, the third message including the information in the set of network coded packets of the first message. The operations of 1930 may be performed according to the methods described herein. In some examples, aspects of the operations of 1930 may be performed by a network coded packet transmitting component as described with reference to FIGS. 8 through 11.

Figure 20:
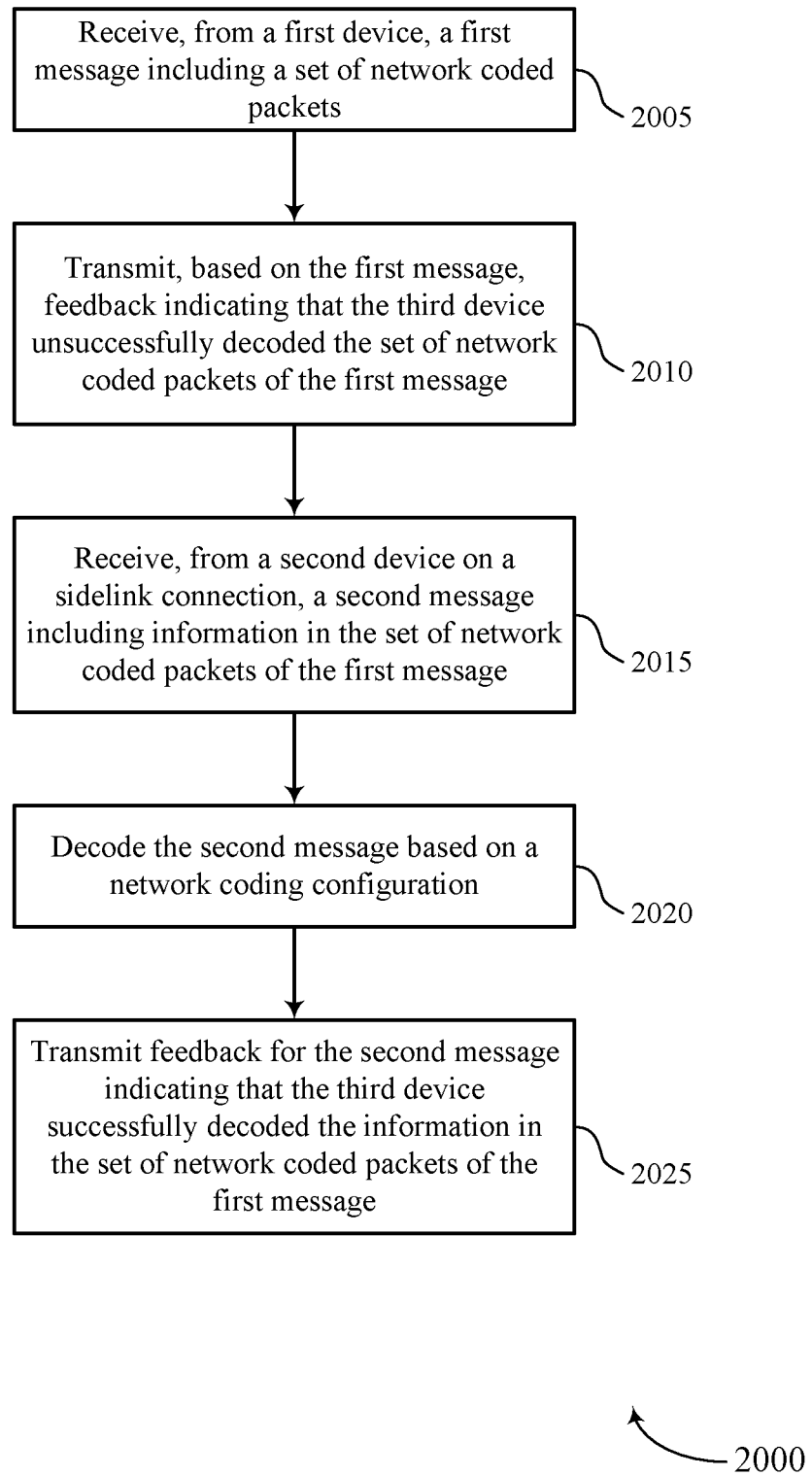

FIG. 20 shows a flowchart illustrating a method 2000 that supports network coding sidelink data transmission in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 2005, the UE may receive, from a first device, a first message including a set of network coded packets. The operations of 2005 may be performed according to the methods described herein. In some examples, aspects of the operations of 2005 may be performed by a direct link communications component as described with reference to FIGS. 8 through 11.

At 2010, the UE may transmit, based on the first message, feedback indicating that the third device unsuccessfully decoded the set of network coded packets of the first message. The operations of 2010 may be performed according to the methods described herein. In some examples, aspects of the operations of 2010 may be performed by a feedback component as described with reference to FIGS. 8 through 11.

At 2015, the UE may receive, from a second device on a sidelink connection, a second message including information in the set of network coded packets of the first message. The operations of 2015 may be performed according to the methods described herein. In some examples, aspects of the operations of 2015 may be performed by a network coded packet receiving component as described with reference to FIGS. 8 through 11.

At 2020, the UE may decode the second message based on a network coding configuration. The operations of 2020 may be performed according to the methods described herein. In some examples, aspects of the operations of 2020 may be performed by a network coded packet decoding component as described with reference to FIGS. 8 through 11.

At 2025, the UE may transmit feedback for the second message indicating that the third device successfully decoded the information in the set of network coded packets of the first message. The operations of 2025 may be performed according to the methods described herein. In some examples, aspects of the operations of 2025 may be performed by a feedback component as described with reference to FIGS. 8 through 11.

The following provides an overview of aspects of the present disclosure:

Aspect 1: A method for wireless communication at a second device, comprising: receiving, from a first device, a first message including a set of network coded packets; transmitting feedback, based at least in part on the first message, indicating that the second device successfully decoded the set of network coded packets of the first message; receiving, from the first device based at least in part on the feedback, a second message comprising a network coding configuration and configuring the second device to transmit a third message comprising information in the set of network coded packets of the first message to a third device on a sidelink connection; generating the third message including the information in the set of network coded packets based at least in part on the network coding configuration in the second message; and transmitting, to the third device on the sidelink connection, the third message comprising the information in the set of network coded packets of the first message.

Aspect 2: The method of aspect 1, further comprising: identifying a set of network coding parameters applied to the first message based at last in part on the network coding configuration, wherein generating the third message is based at least in part on the set of network coding parameters.

Aspect 3: The method of aspect 2, further comprising: receiving an indication of the set of network coding parameters via RRC signaling, DCI, or a MAC-CE, wherein identifying the set of network coding parameters applied to the first message is based at least in part on receiving the indication of the set of network coding parameters.

Aspect 4: The method of any of aspects 1 through 3, further comprising: receiving, from the first device, a configuration including a plurality of sets of network coding parameters; and identifying a set of network coding parameters from the plurality of sets of network coding parameters based at least in part on the network coding configuration in the second message, wherein generating the third message is based at least in part on the identified set of network coding parameters.

Aspect 5: The method of aspect 4, wherein the set of network coding parameters used to generate the third message is different than another set of network coding parameters applied to the first message.

Aspect 6: The method of any of aspects 1 through 5, further comprising: generating a set of network coding parameters for the third message based at least in part on the network coding configuration, wherein generating the third message is based at least in part on the generated set of network coding parameters.

Aspect 7: The method of any of aspects 1 through 6, further comprising: receiving, from the first device, an indication of one or more sets of network coding parameters associated with the set of network coded packets, wherein the one or more sets of network coding parameters comprise a network coding algorithm, an encoding function, an encoding matrix, a number of decoding iterations, or any combination thereof.

Aspect 8: The method of aspect 7, wherein the indication of the one or more sets of network coding parameters is received via a MAC-CE, DCI, RRC signaling, or any combination thereof.

Aspect 9: The method of any of aspects 1 through 8, further comprising: receiving, from the first device, a configuration for the sidelink connection between the second device and the third device, wherein the second message is received from the first device based at least in part on receiving the configuration for the sidelink connection.

Aspect 10: The method of aspect 9, further comprising: reporting one or more connected neighboring devices, changes to the one or more connected neighboring devices, lost connections to the one or more neighboring devices, one or more channel condition changes, one or more connection requests, or any combination thereof.

Aspect 11: The method of any of aspects 1 through 10, further comprising: reporting a sidelink channel quality to the first device; and receiving an indication to enable or disable a network coding scheme for the sidelink connection based at least in part on the sidelink channel quality satisfying a sidelink channel quality threshold, wherein the second message comprises the network coding configuration based at least in part on the indication to enable the network coding scheme.

Aspect 12: The method of aspect 11, further comprising: determining an overhead budget satisfies an overhead budget threshold, wherein the network coding scheme is enabled or disabled based at least in part on the overhead budget satisfying the overhead budget threshold.

Aspect 13: The method of any of aspects 11 through 12, wherein the indication to enable or disable the network coding scheme is received via a MAC-CE, DCI, or both.

Aspect 14: The method of any of aspects 1 through 13, further comprising: determining a sidelink channel quality of the sidelink connection; and transmitting, to the first device, a request to enable or disable a network coding scheme for the sidelink connection based at least in part on the sidelink channel quality satisfying a channel quality threshold, wherein the second message comprises the network coding configuration based at least in part on the request to enable the network coding scheme.

Aspect 15: The method of aspect 14, further comprising: receiving, from the first device, an indication to enable or disable the network coding scheme via a MAC-CE, DCI, or both based at least in part on the request.

Aspect 16: The method of any of aspects 14 through 15, wherein the request to enable or disable the network coding scheme is transmitted via a MAC-CE, UCI, or both.

Aspect 17: A method for wireless communication at a first device, comprising: transmitting a first message including a set of network coded packets to a second device and a third device; receiving, based at least in part on the first message, feedback indicating that that the second device successfully decoded a first plurality of the set of network coded packets and that the third device unsuccessfully decoded a second plurality of the set of network coded packets; transmitting, to the second device based at least in part on receiving the feedback, a second message comprising a network coding configuration and configuring the second device to transmit a third message comprising information in the second plurality of the set of network coded packets of the first message to the third device on a sidelink connection; and receiving, based at least in part on the second message, feedback indicating that the third device successfully decoded the information in the second plurality of the set of network coded packets.

Aspect 18: The method of aspect 17, further comprising: applying a set of network coding parameters to generate the first message; and configuring the second device to use the set of network coding parameters to generate the third message, wherein the network coding configuration indicates the set of network coding parameters.

Aspect 19: The method of aspect 18, further comprising: configuring the set of network coding parameters via RRC signaling, wherein the network coding configuration in the second message indicates to the second device to use the set of network coding parameters.

Aspect 20: The method of any of aspects 17 through 19, further comprising: configuring the second device and the third device with a plurality of sets of network coding parameters; selecting a set of network coding parameters from the plurality of sets of network coding parameters; and transmitting an indication the set of network coding parameters to the second device, wherein the network coding configuration indicates the set of network coding parameters.

Aspect 21: The method of aspect 20, wherein the set of network coding parameters transmitted to the second device is different than another set of network coding parameters used to generate the first message.

Aspect 22: The method of any of aspects 17 through 21, wherein the network coding configuration comprises an indication to generate a set of network coding parameters to apply for the third message.

Aspect 23: The method of any of aspects 17 through 22, further comprising: transmitting, to the second device and the third device, an indication of one or more sets of network coding parameters associated with the set of network coded packets, wherein the one or more sets of network coding parameters comprise a network coding algorithm, an encoding function, an encoding matrix, a number of decoding iterations, or any combination thereof.

Aspect 24: The method of aspect 23, wherein the one or more sets of network coding parameters are indicated via a MAC-CE, DCI, RRC signaling, or any combination thereof.

Aspect 25: The method of any of aspects 17 through 24, further comprising: configuring the sidelink connection between the second device and the third device, the second message is transmitted to the second device based at least in part on configuring the sidelink connection.

Aspect 26: The method of aspect 25, wherein configuring the sidelink connection further comprises: configuring the second device and the third device to report connected one or more neighboring devices, changes to the one or more connected neighboring devices, lost connections to the one or more neighboring devices, one or more channel condition changes, one or more connection requests, or any combination thereof.

Aspect 27: The method of any of aspects 17 through 26, further comprising: determining a sidelink channel quality based at least in part on feedback from the second device, the third device, or both; and enabling or disabling a network coding scheme for the sidelink connection based at least in part on the sidelink channel quality satisfying a sidelink channel quality threshold.

Aspect 28: The method of aspect 27, further comprising: determining an overhead budget satisfies an overhead budget threshold, wherein the network coding scheme is enabled or disabled based at least in part on the overhead budget satisfying the overhead budget threshold.

Aspect 29: The method of any of aspects 27 through 28, wherein enabling or disabling the network coding scheme comprises: transmitting, to the second device, the third device, or both, an indication that the network coding scheme is enabled or disabled via a MAC-CE, DCI, or both.

Aspect 30: The method of any of aspects 17 through 29, further comprising: receiving, from the second device or the third device, a request to enable or disable a network coding scheme for the sidelink connection based at least in part on a sidelink channel quality satisfying a channel quality threshold, wherein the second message comprises the network coding configuration based at least in part on enabling the network coding scheme.

Aspect 31: The method of aspect 30, further comprising: transmitting, to the second device, the third device, or both, an indication to enable or disable the network coding scheme via a MAC-CE, DCI, or both based at least in part on the request.

Aspect 32: The method of any of aspects 30 through 31, wherein the request to enable or disable the network coding scheme is received via a MAC-CE, UCI, or both.

Aspect 33: A method for wireless communication at a third device, comprising: receiving, from a first device, a first message including a set of network coded packets; transmitting, based at least in part on the first message, feedback indicating that the third device unsuccessfully decoded the set of network coded packets of the first message; receiving, from a second device on a sidelink connection, a second message comprising information in the set of network coded packets of the first message; decoding the second message based at least in part on a network coding configuration; and transmitting feedback for the second message indicating that the third device successfully decoded the information in the set of network coded packets of the first message.

Aspect 34: The method of aspect 33, further comprising: identifying a set of network coding parameters applied to the first message based at least in part on the network coding configuration, wherein decoding the second message is based at least in part on the set of network coding parameters.

Aspect 35: The method of aspect 34, further comprising: receiving an indication of the set of network coding parameters via RRC signaling, the second message, DCI, or a MAC-CE, wherein identifying the set of network coding parameters applied to the first message is based at least in part on receiving the indication of the set of network coding parameters.

Aspect 36: The method of any of aspects 33 through 35, further comprising: receiving, from the first device, a configuration including a plurality of sets of network coding parameters; and identifying a set of network coding parameters from the plurality of sets of network coding parameters based at least in part on the second message and the network coding configuration, wherein decoding the second message is based at least in part on the identified set of network coding parameters.

Aspect 37: The method of aspect 36, wherein the set of network coding parameters used to generate the second message is different than another set of network coding parameters applied to the first message.

Aspect 38: The method of any of aspects 33 through 37, further comprising: receiving an indication of a set of network coding parameters used to generate the second message, wherein decoding the second message is based at least in part on the set of network coding parameters.

Aspect 39: The method of any of aspects 33 through 38, wherein the network coding configuration is received from the second device as part of the second message.

Aspect 40: The method of any of aspects 33 through 39, further comprising: receiving, from the first device, an indication of one or more sets of network coding parameters associated with the set of network coded packets, wherein the one or more sets of network coding parameters comprise a network coding algorithm, an encoding function, an encoding matrix, a number of decoding iterations, or any combination thereof.

Aspect 41: The method of aspect 40, wherein the indication of the one or more sets of network coding parameters is received via a MAC-CE, DCI, RRC signaling, or any combination thereof.

Aspect 42: The method of any of aspects 33 through 41, further comprising: receiving, from the first device, a configuration for the sidelink connection between the second device and the third device wherein the second message is received from the second device based at least in part on receiving the configuration for the sidelink connection.

Aspect 43: The method of aspect 42, further comprising: reporting one or more connected neighboring devices, changes to the one or more connected neighboring devices, lost connections with the one or more neighboring devices, one or more channel condition changes, one or more connection requests, or any combination thereof.

Aspect 44: The method of any of aspects 33 through 43, further comprising: reporting a sidelink channel quality to the first device; and receiving an indication to enable or disable a network coding scheme for the sidelink connection based at least in part on the sidelink channel quality satisfying a sidelink channel quality threshold, wherein the second message comprises the network coding configuration based at least in part on the indication to enable the network coding scheme.

Aspect 45: The method of aspect 44, further comprising: determining an overhead budget satisfies an overhead budget threshold, wherein the network coding scheme is enabled or disabled based at least in part on the overhead budget satisfying the overhead budget threshold.

Aspect 46: The method of any of aspects 44 through 45, wherein the indication to enable or disable the network coding scheme is received via a MAC-CE, DCI, or both.

Aspect 47: The method of any of aspects 33 through 46, further comprising: determining a sidelink channel quality of the sidelink connection; and transmitting, to the first device, a request to enable or disable a network coding scheme for the sidelink connection based at least in part on the sidelink channel quality satisfying a channel quality threshold, wherein the second message comprises the network coding configuration based at least in part on the request to enable the network coding scheme.

Aspect 48: The method of aspect 47, further comprising: receiving, from the first device, an indication to enable or disable the network coding scheme via a MAC-CE, DCI, or both based at least in part on the request.

Aspect 49: The method of any of aspects 47 through 48, wherein the request to enable or disable the network coding scheme is transmitted via a MAC-CE, UCI, or both.

Aspect 50: An apparatus for wireless communication at a second device, comprising a processor; memory coupled with the processor; and instructions stored in the memory and executable by the processor to cause the apparatus to perform a method of any of aspects 1 through 16.

Aspect 51: An apparatus for wireless communication at a second device, comprising at least one means for performing a method of any of aspects 1 through 16.

Aspect 52: A non-transitory computer-readable medium storing code for wireless communication at a second device, the code comprising instructions executable by a processor to perform a method of any of aspects 1 through 16.

Aspect 53: An apparatus for wireless communication at a first device, comprising a processor; memory coupled with the processor; and instructions stored in the memory and executable by the processor to cause the apparatus to perform a method of any of aspects 17 through 32.

Aspect 54: An apparatus for wireless communication at a first device, comprising at least one means for performing a method of any of aspects 17 through 32.

Aspect 55: A non-transitory computer-readable medium storing code for wireless communication at a first device, the code comprising instructions executable by a processor to perform a method of any of aspects 17 through 32.

Aspect 56: An apparatus for wireless communication at a third device, comprising a processor; memory coupled with the processor; and instructions stored in the memory and executable by the processor to cause the apparatus to perform a method of any of aspects 33 through 49.

Aspect 57: An apparatus for wireless communication at a third device, comprising at least one means for performing a method of any of aspects 33 through 49.

Aspect 58: A non-transitory computer-readable medium storing code for wireless communication at a third device, the code comprising instructions executable by a processor to perform a method of any of aspects 33 through 49.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a second device, comprising:
   receiving, from a first device, a first message including a set of network coded packets;
   transmitting feedback, based at least in part on the first message, indicating that the second device successfully decoded the set of network coded packets of the first message;
   receiving, from the first device based at least in part on the feedback, a second message comprising a network coding configuration and configuring the second device to transmit a third message comprising information in the set of network coded packets of the first message to a third device on a sidelink connection;
   generating the third message including the information in the set of network coded packets based at least in part on the network coding configuration in the second message; and
   transmitting, to the third device on the sidelink connection, the third message comprising the information in the set of network coded packets of the first message.

2. The method of claim 1, further comprising:
   identifying a set of network coding parameters applied to the first message based at last in part on the network coding configuration, wherein generating the third message is based at least in part on the set of network coding parameters.

3. The method of claim 2, further comprising:
   receiving an indication of the set of network coding parameters via radio resource control signaling, downlink control information, or a medium access control control element, wherein identifying the set of network coding parameters applied to the first message is based at least in part on receiving the indication of the set of network coding parameters.

4. The method of claim 1, further comprising:
   receiving, from the first device, a configuration including a plurality of sets of network coding parameters; and
   identifying a set of network coding parameters from the plurality of sets of network coding parameters based at least in part on the network coding configuration in the second message, wherein generating the third message is based at least in part on the identified set of network coding parameters.

5. The method of claim 4, wherein the set of network coding parameters used to generate the third message is different than another set of network coding parameters applied to the first message.

6. The method of claim 1, further comprising:
   generating a set of network coding parameters for the third message based at least in part on the network coding configuration, wherein generating the third message is based at least in part on the generated set of network coding parameters.

7. The method of claim 1, further comprising:
receiving, from the first device, an indication of one or more sets of network coding parameters associated with the set of network coded packets, wherein the one or more sets of network coding parameters comprise a network coding algorithm, an encoding function, an encoding matrix, a number of decoding iterations, or any combination thereof.

8. The method of claim 7, wherein the indication of the one or more sets of network coding parameters is received via a medium access control control element, downlink control information, radio resource control signaling, or any combination thereof.

9. The method of claim 1, further comprising:
receiving, from the first device, a configuration for the sidelink connection between the second device and the third device, wherein the second message is received from the first device based at least in part on receiving the configuration for the sidelink connection.

10. The method of claim 9, further comprising:
reporting one or more connected neighboring devices, changes to the one or more connected neighboring devices, lost connections to one or more neighboring devices, one or more channel condition changes, one or more connection requests, or any combination thereof.

11. The method of claim 1, further comprising:
reporting a sidelink channel quality to the first device; and
receiving an indication to enable or disable a network coding scheme for the sidelink connection based at least in part on the sidelink channel quality satisfying a sidelink channel quality threshold, wherein the second message comprises the network coding configuration based at least in part on the indication to enable the network coding scheme.

12. The method of claim 11, further comprising:
determining an overhead budget satisfies an overhead budget threshold, wherein the network coding scheme is enabled or disabled based at least in part on the overhead budget satisfying the overhead budget threshold.

13. The method of claim 11, wherein the indication to enable or disable the network coding scheme is received via a medium access control control element, downlink control information, or both.

14. The method of claim 1, further comprising:
determining a sidelink channel quality of the sidelink connection; and
transmitting, to the first device, a request to enable or disable a network coding scheme for the sidelink connection based at least in part on the sidelink channel quality satisfying a channel quality threshold, wherein the second message comprises the network coding configuration based at least in part on the request to enable the network coding scheme.

15. The method of claim 14, further comprising:
receiving, from the first device, an indication to enable or disable the network coding scheme via a medium access control control element, downlink control information, or both based at least in part on the request.

16. The method of claim 14, wherein the request to enable or disable the network coding scheme is transmitted via a medium access control control element, uplink control information, or both.

17. A method for wireless communication at a first device, comprising:

transmitting a first message including a set of network coded packets to a second device and a third device;
receiving, based at least in part on the first message, feedback indicating that that the second device successfully decoded a first plurality of the set of network coded packets and that the third device unsuccessfully decoded a second plurality of the set of network coded packets;
transmitting, to the second device based at least in part on receiving the feedback, a second message comprising a network coding configuration and configuring the second device to transmit a third message comprising information in the second plurality of the set of network coded packets of the first message to the third device on a sidelink connection; and
receiving, based at least in part on the second message, feedback indicating that the third device successfully decoded the information in the second plurality of the set of network coded packets.

18. The method of claim 17, further comprising:
applying a set of network coding parameters to generate the first message; and
configuring the second device to use the set of network coding parameters to generate the third message, wherein the network coding configuration indicates the set of network coding parameters.

19. The method of claim 18, further comprising:
configuring the set of network coding parameters via radio resource control signaling, wherein the network coding configuration in the second message indicates to the second device to use the set of network coding parameters.

20. The method of claim 17, further comprising:
configuring the second device and the third device with a plurality of sets of network coding parameters;
selecting a set of network coding parameters from the plurality of sets of network coding parameters; and
transmitting an indication the set of network coding parameters to the second device, wherein the network coding configuration indicates the set of network coding parameters.

21. The method of claim 17, wherein the network coding configuration comprises an indication to generate a set of network coding parameters to apply for the third message.

22. The method of claim 17, further comprising:
transmitting, to the second device and the third device, an indication of one or more sets of network coding parameters associated with the set of network coded packets, wherein the one or more sets of network coding parameters comprise a network coding algorithm, an encoding function, an encoding matrix, a number of decoding iterations, or any combination thereof.

23. The method of claim 17, further comprising:
configuring the sidelink connection between the second device and the third device, the second message is transmitted to the second device based at least in part on configuring the sidelink connection.

24. The method of claim 23, wherein configuring the sidelink connection further comprises:
configuring the second device and the third device to report connected one or more neighboring devices, changes to the one or more connected neighboring devices, lost connections to the one or more neighboring devices, one or more channel condition changes, one or more connection requests, or any combination thereof.

25. The method of claim 17, further comprising:
determining a sidelink channel quality based at least in part on feedback from the second device, the third device, or both; and
enabling or disabling a network coding scheme for the sidelink connection based at least in part on the sidelink channel quality satisfying a sidelink channel quality threshold.

26. The method of claim 25, wherein enabling or disabling the network coding scheme comprises:
transmitting, to the second device, the third device, or both, an indication that the network coding scheme is enabled or disabled via a medium access control control element, downlink control information, or both.

27. The method of claim 17, further comprising:
receiving, from the second device or the third device, a request to enable or disable a network coding scheme for the sidelink connection based at least in part on a sidelink channel quality satisfying a channel quality threshold, wherein the second message comprises the network coding configuration based at least in part on enabling the network coding scheme.

28. The method of claim 27, further comprising:
transmitting, to the second device, the third device, or both, an indication to enable or disable the network coding scheme via a medium access control control element, downlink control information, or both based at least in part on the request.

29. An apparatus for wireless communication at a second device, comprising:
a processor,
memory coupled with the processor; and
instructions stored in the memory and executable by the processor to cause the apparatus to:
receive, from a first device, a first message including a set of network coded packets;
transmit feedback, based at least in part on the first message, indicating that the second device successfully decoded the set of network coded packets of the first message;
receive, from the first device based at least in part on the feedback, a second message comprising a network coding configuration and configuring the second device to transmit a third message comprising information in the set of network coded packets of the first message to a third device on a sidelink connection;
generate the third message including the information in the set of network coded packets based at least in part on the network coding configuration in the second message; and
transmit, to the third device on the sidelink connection, the third message comprising the information in the set of network coded packets of the first message.

30. An apparatus for wireless communication at a first device, comprising:
a processor,
memory coupled with the processor; and
instructions stored in the memory and executable by the processor to cause the apparatus to:
transmit a first message including a set of network coded packets to a second device and a third device;
receive, based at least in part on the first message, feedback indicating that that the second device successfully decoded a first plurality of the set of network coded packets and that the third device unsuccessfully decoded a second plurality of the set of network coded packets;
transmit, to the second device based at least in part on receiving the feedback, a second message comprising a network coding configuration and configuring the second device to transmit a third message comprising information in the second plurality of the set of network coded packets of the first message to the third device on a sidelink connection; and
receive, based at least in part on the second message, feedback indicating that the third device successfully decoded the information in the second plurality of the set of network coded packets.

* * * * *